United States Patent [19]
Shurmer et al.

[11] Patent Number: 5,974,237
[45] Date of Patent: Oct. 26, 1999

[54] COMMUNICATIONS NETWORK MONITORING

[75] Inventors: John Gavin L'Estrange Shurmer, Herts; Kathryn Elizabeth Burn-Thornton, Ruislip, both of United Kingdom; Daniel Zlatin, Nepean, Canada; Stephen Charles Cross; Reuben Wells, both of Bishops Stortford, United Kingdom

[73] Assignee: Northern Telecom Limited, Montreal, Canada

[21] Appl. No.: 08/769,208

[22] Filed: Dec. 18, 1996

[51] Int. Cl.[6] .................................................. G06F 15/177
[52] U.S. Cl. ................................ 395/200.54; 395/200.53
[58] Field of Search .................... 395/200.54, 200.53, 395/837, 838

[56] References Cited

U.S. PATENT DOCUMENTS

| | | | |
|---|---|---|---|
| 4,456,788 | 6/1984 | Kline ............................................ | 179/7 |
| 4,858,152 | 8/1989 | Estes ........................................... | 364/550 |
| 5,031,211 | 7/1991 | Nagai ........................................... | 379/221 |
| 5,046,039 | 9/1991 | Ugajin .......................................... | 364/900 |
| 5,204,955 | 4/1993 | Kagei ........................................... | 395/575 |
| 5,388,258 | 2/1995 | Larsson ........................................ | 395/600 |
| 5,483,631 | 1/1996 | Nagai et al. ................................ | 395/155 |
| 5,490,199 | 2/1996 | Fuller et al. ................................. | 379/1 |
| 5,493,689 | 2/1996 | Waclawsky et al. ..................... | 395/821 |
| 5,517,622 | 5/1996 | Ivanoff ......................................... | 395/200.13 |
| 5,522,042 | 5/1996 | Fee et al. ..................................... | 395/200.01 |
| 5,559,958 | 9/1996 | Farrand ........................................ | 395/183.03 |
| 5,568,471 | 10/1996 | Hershey et al. ........................... | 370/17 |
| 5,678,006 | 10/1997 | Valijadeh et al. ......................... | 395/200.02 |
| 5,771,349 | 6/1998 | Picazo, Jr. et al. ....................... | 395/188.01 |
| 5,790,797 | 8/1998 | Shimada et al. .......................... | 395/200.54 |
| 5,793,753 | 8/1998 | Hershey et al. ........................... | 370/252 |
| 5,793,976 | 8/1998 | Chen et al. ................................. | 395/200.54 |

FOREIGN PATENT DOCUMENTS

| | | |
|---|---|---|
| WO 95/15635 | 6/1995 | WIPO . |
| WO 95/34974 | 12/1995 | WIPO . |
| WO 95/39475 | 12/1995 | WIPO . |
| WO 97/00479 | 1/1997 | WIPO . |

OTHER PUBLICATIONS

Gallagher, "Visualization: the look of reality", IEEE Spectrum, Nov., 1994, pp. 48–54.

Network Monitoring Fundamentals and Standards http://www.cis.ohio-state,edu/%7ejain/cis788–97/net_monitoring/index.htm, Aug. 14, 1997.

B. Stewart, "Definitions of Managed Objects for Character Stream Devices Using SMIv2," Network Working Group, Xyplex Inc. RFC 1658 pp. 1–18, Jul. 1994.

Case et al, "Structure of Management Information for Version 2 of the Simple Network Management Protocol (SNMPv2)," Network Working Group, RFC 1902, pp. 1–40, Jan. 1996.

S. Waldbusser, "Remote Network Monitoring Management Information Base," Network Working Group, RFC 1757 pp. 1–91, Feb. 1995.

*Primary Examiner*—Mehmet B. Geckil
*Attorney, Agent, or Firm*—Lee, Mann, Smith, McWilliams, Sweeney & Ohlson

[57] ABSTRACT

The disclosure relates to a method of monitoring a communications network comprising a plurality of node equipment 2, e.g. switches, and link equipment, e.g. fibre optic links, in which performance parameters of individual components of the node equipment are used to determine an overall performance parameter for the node equipment. By comparing like performance parameters for individual network elements, the performance of different types of network element can be compared with each other. Parameters which can be monitored include quality of service, cell discard, cell loss, and other measures of network performance. Connection tracing through the plurality of node equipment and link equipment is also achieved.

18 Claims, 25 Drawing Sheets

Performance Data Session Manager

File  Tools

Sessions: ~110

| ? Name | Layer | Date | Start Time | Duration | Interval | Status |
|---|---|---|---|---|---|---|
| pvc_1_and_switch | Service | 3 May 1996 | 12:05:05 pm | 0:15:00 | 0:00:30 | Active |
| pvc_14_and_switch | Service | 3 May 1996 | 12:07:00 pm | 0:15:00 | 0:00:30 | Active |

[Start]  [Stop]  [Delete]  [Export]  [Graph]

Sessions Details:

Name: pvc_4_and_switch    Timing: Now    Duration: 15 minutes
Layer: Service ▾           Start Time: 12:03:17 pm    Polling Interval: 30 seconds
                           End Time: 12:18:17 pm ~114

Resource:                  Dataset Template:           Components:
PVC User #1 - SE2:SE4      Service & Link              Link:Service 1-Switch 2 1
PVC User #2 - SE2:SE4      Service & Switch            Link:Service 2-Switch 3 1
PVC User #3 - SE1:SE3                                  ~113
PVC User #4 - SE1:SE3
~111

[Close]                    [Open Template Manager]

FIG 11

COMMUNICATIONS NETWORK MONITORING

FIELD OF THE INVENTION

The present invention relates to the field of communications networks comprising a plurality of node elements connected by a plurality of link elements, and particularly although not exclusively, to a network monitoring method and monitoring apparatus for implementing the same.

INTRODUCTION

A conventional multi service communications network, for example a telephony network, a mobile phone network, or a computer network, such as a local area network (LAN) or wide area network (WAN), comprises a plurality of nodes, at which are provided node equipment, the nodes connected by a plurality of communications links, the links comprising link equipment. The node equipment may comprise, for example a personal computer or a telecommunications switch apparatus, and the links may comprise, for example a coaxial cable linking computers, or a terrestrial or atmospheric telecommunications link, such as an optical fibre link, microwave link or the like.

Typically, a communications network will comprise several different types of node equipment and several different types of link equipment. Due to technological upgrades of customer equipment served by the node equipment, and due to new communications services becoming available, there are increasing band width demands and increased connectivity requirements from network users. Individual node equipment may become overloaded, and individual link equipment may become saturated leading to congestion on the network.

To maintain usability of the network, it is important to identify node or link equipment which is working at or near its full capacity, and to identify equipment which is not performing efficiently or is performing below its full specification capability. Additionally, when service problems are encountered on the network, there is a need to respond to enquiries from network user customers to identify quickly the technical cause of any problems which the network customer is experiencing.

SUMMARY OF THE INVENTION

In one aspect of the present invention, there is provided a method of monitoring operational parameters of a communications network comprising a plurality of interconnected network elements, by contemporaneously performing a plurality of monitoring sessions, each monitoring a respective operational parameter or set of operational parameters of said network elements, said method comprising the steps of:

for each monitoring session, inputting a set of operational parameters to be monitored;

for each monitoring session, collecting data signals from at least one network element, said data signals containing data relating to said operational parameters; and for each monitoring session creating a respective display of said data relating to said operational parameters.

Preferably step of creating a display includes arranging said data signals into a form suitable for presentation in graphical form.

Preferably, the method comprises the step of collecting a plurality of data signals from said network elements, said data signals collected in a format specific to a particular network element; and converting said network element specific data signals into a generic format independent of said network element.

Said step of converting said data signals comprises encapsulating a said data signal in an object of an object oriented programming language.

Preferably, said method comprises collecting a plurality of component data signals each relating to an operation of an individual component of a network element.

Preferably, the method comprises the step of generating an element data signal relating to an overall operation of a network element, said element data signal being generated in response to a said plurality of component data signals.

Preferably, said step of generating an element data signal includes determining said element data signal in accordance with a stored relationship.

Said stored relationship may be stored as an object in an object oriented programming language.

Preferably, the method comprises the steps of:

assigning to each network element, a network element server;

for each monitoring session, creating a respective signal specifying a plurality of network elements from which to collect data signals;

activating element servers corresponding to said selected network elements specified in said signal, for collecting data signals from their corresponding assigned network elements.

According to a second aspect of the present invention there is provided a data monitoring apparatus for monitoring operational parameters of a communications network comprising a plurality of interconnected network elements, in which a plurality of users can each contemporaneously perform at least one monitoring session, each monitoring a respective operational parameter or set of operational parameters of said network elements, said apparatus comprising;

means for managing a plurality of individual data monitoring sessions, said means comprising means for creating a monitoring session display for each monitoring session and means for inputting a plurality of operational parameters to be monitored for each monitoring session;

means for collecting data signals from one or a plurality of network elements for each monitoring session, said data signals containing data relating to said operational parameters; and means for creating a display of said data relating to said operational parameters.

Preferably, said means for managing a plurality of data monitoring sessions comprises a processor and a portion of memory operated in accordance with a management application, said management application capable of:

for each monitoring session compiling a signal describing a list of operational parameters to be monitored;

sending said signal to a plurality of element servers which obtain data signals from the network elements; and receiving said data signals containing data relating to said operational parameters and arranging said data signals into a form suitable for presentation of said operational parameters in a graphical form.

Preferably, said means for collecting data signals comprises a processor and a portion of memory operated in accordance with a plurality of element server applications, each element server application capable of collecting a plurality of data signals in a format specific to a particular network element and converting said data signals into a format independent of said network element and acceptable by said means for managing a plurality of data monitoring sessions.

Said format may comprise an object in an object oriented programming language.

Preferably, said means for collecting data signals from one or a plurality of network elements operates to collect a plurality of component data signals each relating to an operation of an individual component of a network element.

Preferably, said apparatus comprises:
 means for generating an element data signal relating to an overall operation of a network element, said element data signal being generated in response to a said plurality of component data signals.

Said means for generating an element data signal may comprise a processor and a portion of memory operated in accordance with an object oriented application program, in which an object describes a relationship between a plurality of component data signals.

Preferably, each element server is assigned to one or a plurality of network elements.

BRIEF DESCRIPTION OF THE DRAWINGS

For a better understanding of the invention, and to show how the same may be carried into effect, reference will now be made to the accompanying diagrammatic drawings which illustrate by way of example only, preferred embodiments and processes according to the invention, and in which:

FIG. 11 illustrates a session manager display on a display device of the monitoring apparatus;

DETAILED DESCRIPTION OF THE PREFERRED EMBODIMENTS AND METHODS

Preferred embodiments and processes of the invention will now be described by way of example only with reference to the accompanying drawings identified above.

General Overview of Monitoring Apparatus

Figure 1:
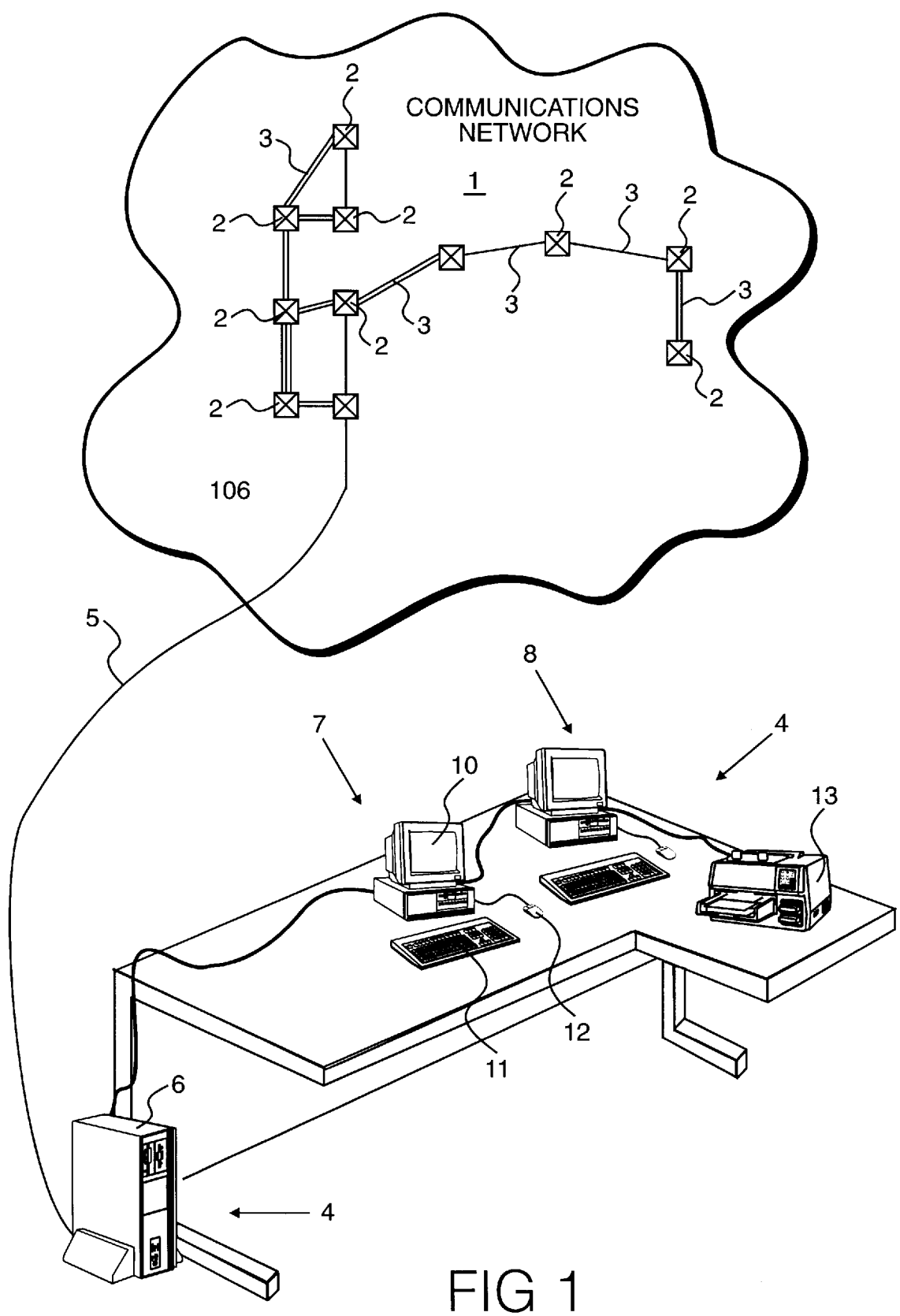
FIG. 1 illustrates an overview of a network monitoring apparatus according to a first specific embodiment of the present invention.

Referring to FIG. 1 herein a communications network 1 comprises a plurality of node elements 2 each comprising an item of node equipment e.g. a switch, and a plurality of link elements 3, connecting the node elements, each link element 3 comprising an item of link equipment. Message signals are transmitted along the link equipment and through the node equipment. Each item of node equipment comprises a plurality of individual physical components. Each item of link equipment may comprise one or a plurality of physical components. Each link equipment may support a plurality of communication channels.

The communications network 1 may comprise a computer network, for example a plurality of personal computers, workstations or the like as node elements 2 connected by a local area network, as the link elements 3, or may comprise a wide area network, ethernet or the like, or a telecommunications network comprising a plurality of switch apparatus as the node equipment 2, and a plurality of terrestrial, atmospheric, or satellite communications links comprising the link elements 3 linking the node elements. The communications network may include mobile phone communications apparatus, resident at one or more nodes of the network and a node element may comprise a gateway to another network, e.g. a world-wide-web gateway. In general, the communications network will comprise a variety of different types of node equipment, and a variety of different types of link equipment, made by different manufacturers, and having differing performance specifications.

In communication with the network elements is a network monitoring apparatus 4 according to a first specific embodiment of the present invention. The network monitoring apparatus communicates with each individual node element of the network, via a communications link 5. The monitoring apparatus 4 may be located at a site adjacent to a node element, or at a site remote from a node element. The communications link 5 between the monitoring apparatus and the node elements may be effected through a single entry point to the network, for example via a single node element. Communication with other node elements of the network at geographically separated locations may be made through the link elements and node elements of the communications network itself. The monitoring apparatus communicates with each individual node element of the network and is capable of monitoring the network as a whole by monitoring each individual node element of the network. In a preferred embodiment the network monitoring apparatus comprises a Hewlett Packard workstation 6 having a server station and one or more client stations 7, 8, each comprising a user interface 9 consisting of a display monitor 10, a keyboard 11 and pointing device 12, and including a printer 13.

Hereinafter, the first specific embodiment monitoring apparatus will be described in the context of monitoring a telecommunications network capable of supporting multi-services such as voice, data, and image signals, although it will be understood that the embodiment and methods described herein encompass the monitoring of communications networks in general, of the type comprising nodes and links.

Figure 2:
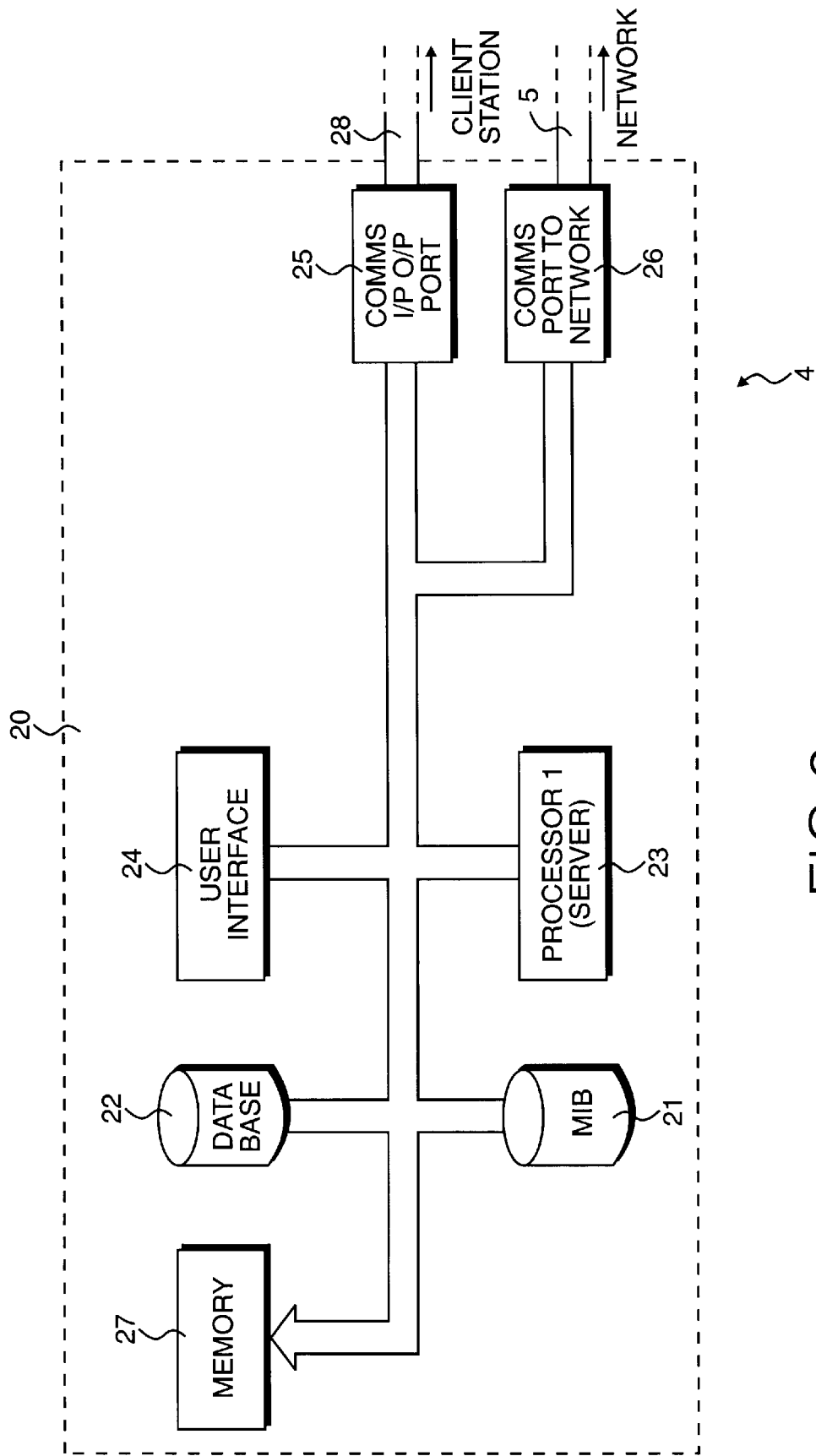
FIGS. 2 and 3 illustrate a functional hardware architecture of the apparatus of FIG. 1.
Figure 3:
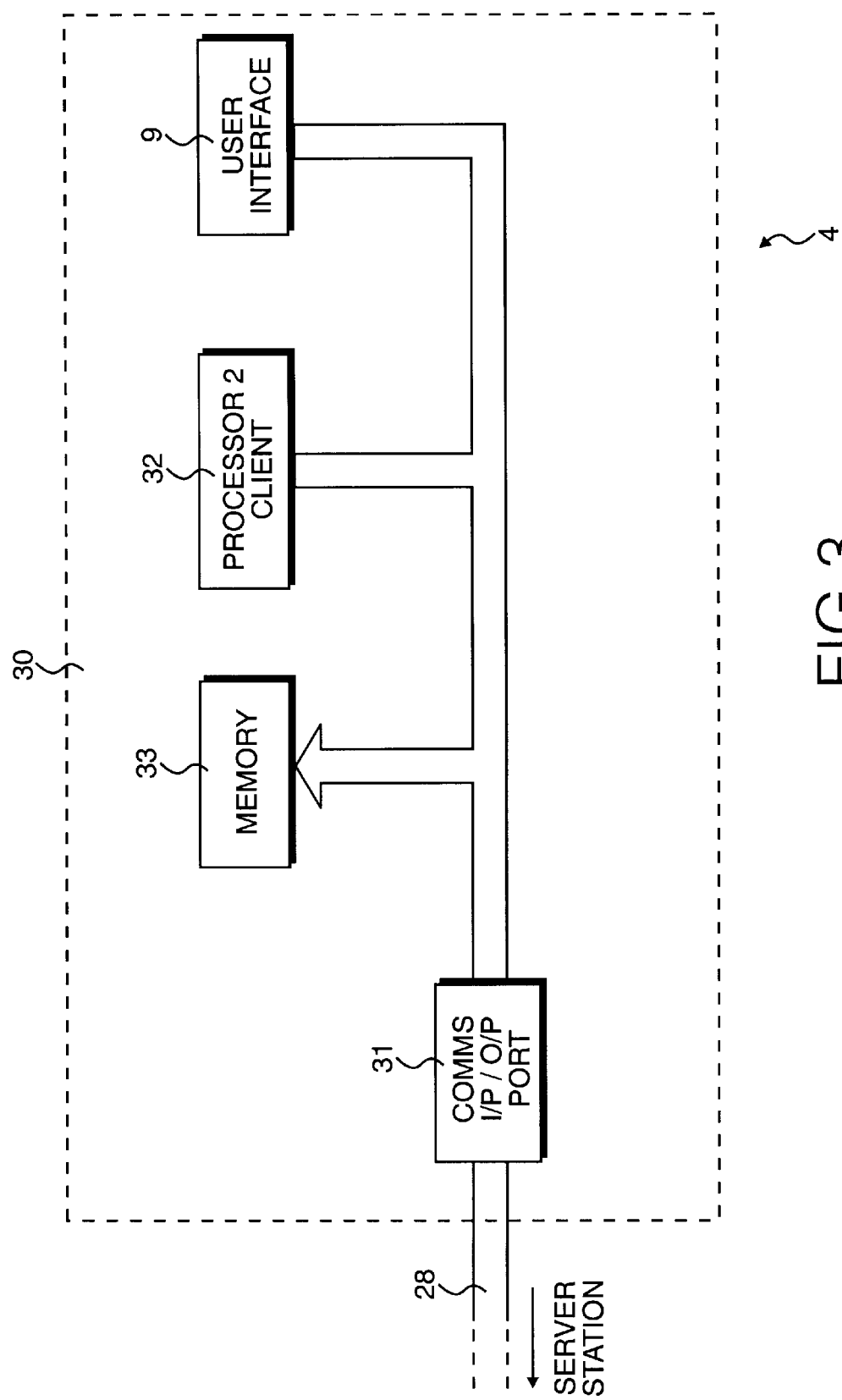

Referring to FIGS. 2 and 3 herein, the monitoring apparatus 4 comprises a server processor station 20 and one or more client processor stations 30 for collecting signals concerning operating of the network, and for processing data describing the network. Elements of the server station as they apply to the data monitoring apparatus 4 comprise database 22, a management information base 21; a processor 23; a user interface 24 including a monitor, keyboard, pointing device for example a mouse; a communications input output port 25 for communicating with the client station 30; a communications port 26 for communicating with the network elements; a memory 27 for storing control signals in the form of a program for operating the data monitoring apparatus and also for storing data signals in the form of data files created by the data monitoring control program; and a data bus 28 for communicating between the management information base 21, database 22, processor 23, user interface 24, communications ports 25, 26 and the memory 27.

The network monitoring apparatus interfaces with a conventional telecommunications network management system. In the preferred embodiment the network management system resides on the server station 20 and shares the server station with the network monitoring apparatus. Elements of the network management system which share the server with the monitoring apparatus comprise the database 22 and the management information base 21. The network management system obtains data describing the performance of individual node elements 2 of the network.

The individual nodes 2 of the network may comprise different types of switch equipment, made by different manufacturers. In some older types of switch, the switch stores information concerning the connections of the switch to other switches in the network. This information is obtainable by the network system manager by addressing the switch and reading the connections between the switch and other switches on the network. Data concerning individual operations of the switch, and of individual components of the switch is available to the network manager system by addressing the switch every time such data is required. The data is dynamically supplied to the network management system by the switch, upon receipt of a request signal from the network management system.

In more sophisticated conventional switches, a map of the network and connections between switches is stored in a management information base 21. For example in the Concorde System Manager for use with the Concorde® asynchronous transfer mode (ATM) multi-media switch produced by Northern Telecom Limited, a management information base (MIB) comprises a software representation of all components of the nodes and links and individual connections between the components in a telecommunications network. The network management system of the Concorde switch, i.e. the Concorde System Manager (CSM) retrieves data from individual components of all switches in the network and stores these in an database 22. Individual performance data describing operation of individual components is automatically polled in the switch every fifteen or thirty minutes, and stored in the database 22. The data base 22 physically comprises a large capacity disk drive capable of storing gigabytes of data. The historical data base stores a number of hours worth of data concerning the operation of the Concorde switch, for example two day's worth of data. The oldest data within the data base is over written by the most recent data obtained from the switch. Certain types of data may be prioritised for storage. For example billing data may be retained within the data base, in preference to other types of data.

Referring to FIG. 3 herein, the client station 30 comprises an input/output communications port 31 for connecting to the communications input/output port 25 of the server station, enabling the client and server to communicate with each other; a processor 32; the user interface 9, comprising a monitor, a keyboard, and a pointing device e.g. a mouse, and a further display device e.g. a printer; and a memory 33 for storing control signals in the form of a control program, for controlling the data processor 32 to perform data processing operations, and for storing data files in the form of data signals in response to operation of the control program. The communications ports 25, 31 communicate with each other using the known CORBA protocol (Common Object Request Broker Architecture).

Operational Overview

Referring to FIGS. 1 to 4, users of the client stations 7, 8 are each able to investigate operation of individual aspects of the network from the client stations by performing a data collection session. Using the user interface 9, the user of the monitoring apparatus may identify individual network elements by creating a visual display on the visual display unit 10. The user inputs keypad command signals on the keyboard, or inputs signals using the pointing device 12 to draw an electronically generated curser across a display screen which displays an electronically generated menu image in order to select and identify individual node or link elements to be monitored. The electronically generated menu presents a set of available operational parameters for which an interrogable response is supported on one or more of the network elements.

Operational parameters can be categorised as:

performance parameters describing the performance of a network element, or an individual component of the network element a service parameter, describing a service supported by one or a plurality of network elements Examples of performance parameters may comprise:

a switching capacity of an individual node element;

a bandwidth of an individual link element;

a cell discard rate of an individual node element or an individual component of a node element;

a time when an individual channel through a node element is unavailable (line unavailable);

a proportion of time when errors occur on a particular channel on a node element, or for all the channels on an element as a whole;

a proportion of time when severe errors occur on a line channel through a node element;

a number of line code violations;

a number of line protection switches.

The network monitoring apparatus interrogates each item of node equipment by either sending out interrogation signals to the node equipment to initiate a data signal response from the node equipment, or by reading data signals already generated by the node equipment. Each item of node equipment supplies a plurality of component data signals (hereafter referred to as component signals) relating to operations of its components, such as the performance or status of a component or a service supported by individual components of the node equipment, or by supplying element data signals (hereafter referred to as element signals) relating to the operation of the node equipment as a whole. Operation of the link elements, which may be of a passive nature not capable of generating component or element signals, may be determined from the component signals and/or element signals obtained from the node equipment.

In general, the user of the monitoring apparatus may monitor the performance and service parameters of the node and link elements by displaying operation data at three levels, determined for each element by the availability of information contained in the component or element signals obtained.

Firstly, at a component level the user of the apparatus may monitor individual components of a particular node equipment. At the component level, the user may inspect for example, the performance of individual line cards in a telecommunications switch.

Secondly, at a network level, the user may monitor the performance of individual node elements and link elements of the communications network by inspection of the element signals of selected elements in order to gain an appreciation of the performance of the network as a whole, or of specific node or link elements of the network. By monitoring the element signals of each network element of interest in relation to a selected performance or service parameter, selected at the user interface 24, the user may identify problems or inefficiencies in the communications network. For example a user may identify a particular node element at which there is a high cell discard, or a particular link where the volume of traffic presented to the link exceeds the bandwidth of the link, leading to loss of communications signals over the network and poor quality of communications service (QoS) between users of the network.

Thirdly, at a service level and at an associated service level which is a sub-level of the service level, the user may monitor a service on the network, for example a connection, by specifying a service parameter using the user interface 9. The service level enables channel tracing of a service through individual components of node equipment. For example at the service level, a user may trace an individual communications connection through the network in order to collect data from the components within the switch which are supporting the connection. The monitoring apparatus identifies which particular line cards in a telecommunications switch a call is being routed through, and which input and output port components of the switch the call uses and which particular link equipment the connection is routed over, and provides selected data concerning the performance and status of only those components which are supporting the connection.

Monitoring of a communications network at the network or service levels may be particularly useful as a diagnostic tool for improving the speed at which a complaint or query received from a customer of a communications network service may be investigated, and to identify particular elements of the network which are problematic to one or more customers of the network. Additionally, monitoring of operational parameters at the network or service levels may enable non-technical business manager users to identify patterns of customer usage of a network, with a view to developing new customer service packages to be supported on the network.

Element and component signals representing service or performance parameters of individual network elements may be converted to display signals for display at the user interface 9, and may be presented in the form of charts and graphs, which may be displayed on the visual display unit of the user interface 9 or printed out on the printer device 13.

Figure 4:
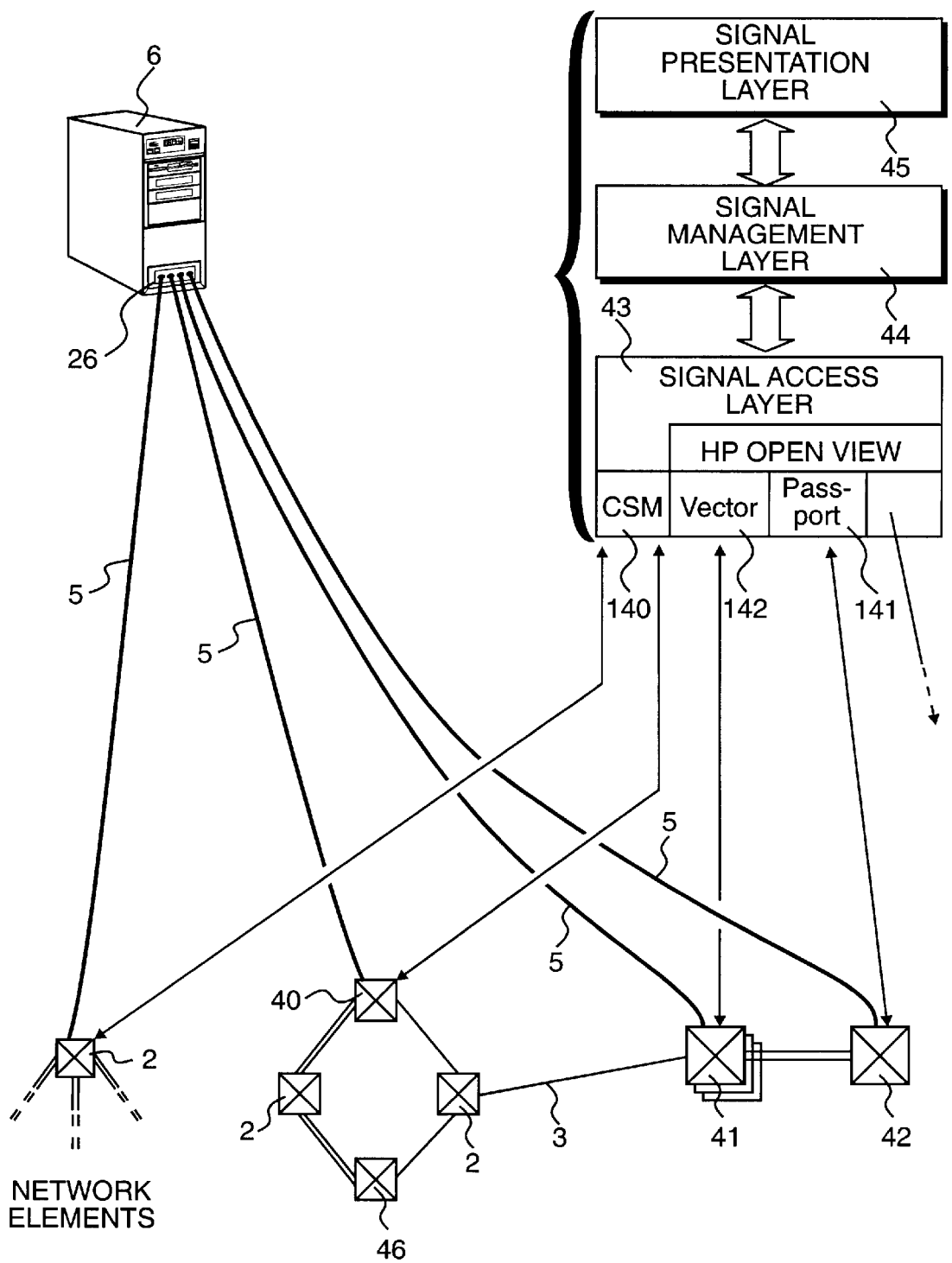
FIG. 4 illustrates schematically a hierarchical control and data processing structure of the network monitoring apparatus in relation to a communications network.

Referring to FIG. 4 herein there is shown schematically a layout of hardware comprising the network monitoring apparatus and a communications network, together with a hierarchy of control instructions 43, 44, 45 for operating the monitoring apparatus. Component signals are transmitted from the individual node elements to the communications input\output port 26 of the monitoring apparatus 4 over the communications link 5. For ease of description in FIG. 4, the communications link 5 has been shown schematically as a separate cable connected to each node element 2, however in practice in a geographically extended network, component signals may be multiplexed and transmitted over the network itself to a central entry point at one or more individual node locations. The communications network comprises a selection of different types of individual node equipment comprising the node elements 2.

Figure 5:
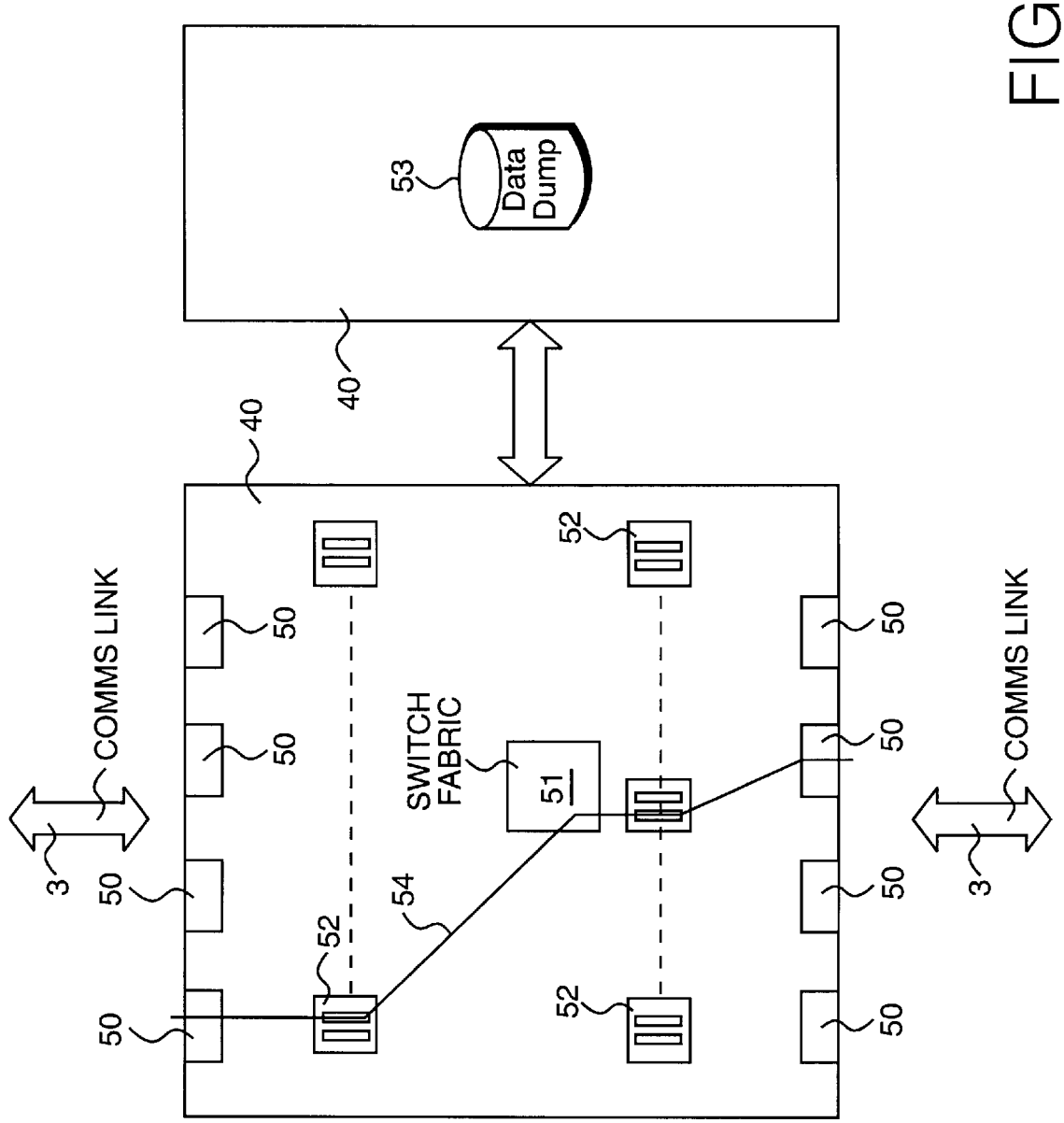
FIG. 5 illustrates a first example of a node equipment comprising the communications network.

For example, a first node element 40 comprises a Concorde type switch operating in the asynchronous transfer mode (ATM) communications protocol as illustrated in greater detail in FIG. 5 herein. The switch connects a plurality of communications channels of the links 3 through input\output ports 50. The links may comprise co-axial cables, optical fibre cables, or the like. Inside the switch is provided a switch fabric card 51 comprising an array of electronic switches for connecting and disconnecting input\output ports with each other for routing of communications calls through the switch. All communications signals handled by the switch pass through the switch fabric card 51. Multi-service data for example voice data, fax data, or modem processed data arrives at the input ports in the form of cell signals, and passes through the switch fabric card 51 which routes the cell signals, to exit through an appropriate output port, depending upon the destination of the data. Cell signals are stored in buffers and queues provided on Ax cards represented 52 in FIG. 5, prior to entering the switch fabric. In FIG. 5 one signal path 54 is shown schematically as an example. The volume of data traffic through the switch typically is large. Gigabits of data per second may arrive at the input ports, to be routed by the switch fabric 51 to the appropriate output ports and transmitted out of the switch. Demands on the performance of the switch fabric card are high. Where the volume of cell signals is high, due to high volume of data traffic, the buffers and queues 52 may overflow, and cell signals stored in the buffers may be overwritten by new cell signals joining the queue for the switch fabric, leading to loss of cell signals. This is known as cell discard. For each Ax card the rate of cell discard is a performance parameter of the particular Ax card component 52 comprising the switch 40. The cell discard is logged by an automatically generated component signal which contains the data of the cell discard rate for the Ax card component. In the Concorde Switch, the cell discard component signal is periodically generated for each Ax card.

In a modern switch, there may be provided a selection of component signals, each component signal comprising data concerning performance of an individual component with respect to a specified performance parameter or a status of the component, e.g. on or off. Component signals available from the Concorde Switch include, for example, cell discard, rate of incoming cells; rate of outgoing cells; queue fill of delay queues. In the Concorde switch, the component signals are generated by the switch are selected to be read at intervals of every fifteen minutes and are stored in data dump 53 of the switch. The component signal stored at fifteen minute intervals represent operations of individual components of the switch at that particular time. The component signals stored in the data file are transferred to the database 22 of the network manager, which stores the sets of component signals produced every fifteen minutes by the switch. The database 22 comprises a hard drive to the server. Transfer of data from the data dump 53 of the switch to the historical data base of the network manager is effected by the network manager, which logs on to the switch and requests transfer of the data from the data dump 53 using a conventional file transfer protocol. Data is transferred from the data dump 53 through a port 50, and over the communication link 3, one channel of which may comprise the communications link 5, out of the switch to the network manager. Sets of component signals representing operations of the individual components at fifteen minute intervals are stored as data signals in the database 22, until the data base is full, at which point the oldest data is overwritten by more recent data. Typically, the database 22 of the network manager stores 32 sets of scheduled component signal outputs of the switch, corresponding to poled data over an eight hour period. Since the construction and performance of the switch apparatus 40 is highly complex, the amount of component signals generated is large, and storage of component signals requires a large amount of memory.

In the known Concorde switch, typically there are an order of magnitude of hundreds of buffer locations where cells can be stored during their migration from an input port to an output port. These buffer locations are found on line cards, Ax cards and on the switch fabric cards. The number of buffers on each switch depends on the number of line cards, switch fabric cards and Ax cards in the switch, and can vary from switch to switch. Each buffer has typically three or four parameters describing performance, such as the occupancy of the buffer, the rate at which cells are passing through the buffer, and the type of cells in the buffer. In one example of a Concorde switch, there are sixteen line cards.

In addition to providing the scheduled fifteen minute data dump of historical performance data, the Concorde switch can be interrogated in real time to produce current component signals corresponding to the real time operation of the switch, in response to the interrogation signals. For a user wishing to obtain real time data concerning operations of the switch, the monitoring apparatus converts a user's query entered via the user interface in to a set of appropriate interrogation signals generated by the monitoring apparatus to interrogate the switch with respect to the user's selected performance parameters or service level query. Interrogation signals are received via the communications ports 50, and component signals are provided in response, directly over the link 5.

The storage of component and element signals in the database 22 is performed to give specified component or element signals relating to specified parameters such as cost of billing, to have higher priority for storage than other component or element signals relating to other parameters, for example cell discard. By giving certain sets of data signals priority over others, the information contained in the signals can be prioritised in terms of allocation of storage space in the database 22 to reduce the risk of loss or overwriting of the component or element signals relating to the more important operational parameters. The importance hierarchy of the operational parameters may be predetermined by setting a set of control signals controlling the priority of component and element signals.

Other switches 41, 42 of the communications network may be less sophisticated than the switch 40 described with reference to FIG. 5 herein. Other telephone switch types may provide component signals from which a lesser range of parameters can be determined. Component signals may be unavailable for certain types of performance parameters. Further, for some Switch types rather than the switch automatically generating component signals at regular intervals, and the network manager storing these in a database, the component signals at regular intervals may need to be obtained by interrogating the individual components of the switch dynamically in real time by a respective interrogation signal for each component, the interrogation signals being supplied by the monitoring apparatus.

For example, in the known Vector® type switch 41, available from Northern Telecom Ltd, performance data is not periodically dumped by this type of switch, and so the monitoring apparatus accesses the performance data dynamically in real time using a conventional protocol, for example the Hewlett Packard SNMP (Simple Network Management Protocol).

In a network comprising a plurality of Concorde switches managed by a Concorde System Manager (the network manager) and one or more Vector switches, the management information base of the network manager does not contain a map of the individual components of the Vector switch. The Vector switch has its own local management information base, and the present monitoring systems addresses requests for performance data concerning the Vector switch through the local management information base of that switch. Interrogation signals sent to the Vector switch in real time result in real time component signals being obtained from the Vector switch.

Since the network as a whole comprises different node equipment types, each capable of generating different sets of component signals relating to different sets of performance parameters or service parameters, individual node or link equipment may not be directly comparable with each other by comparing the component signals in a form as output from the node equipment. As well as describing different types of parameters from switch to switch, the component signals obtained from different types of switches may be generated in different signal formats e.g. analog or digital, or in different protocols. The sets of component signals obtained from the node elements are equipment specific.

The monitoring apparatus is capable of inspecting the historical data comprising the component signals downloaded every fifteen minutes from the switch, in their stored location in the data base 22 of the network manager. The monitoring apparatus is also capable of dynamically interrogating each switch in real time to obtain real time component signals from the switches.

A plurality of component signals for each selected node element are collected under control of the processors 23, 32 in accordance with instructions stored in the memory 27. The instructions stored in the memory 27 for collection of the component and\or element signals are described in FIGS. 4 and 6 in a hierarchical form.

Control and Data Processing Overview

Figure 6:
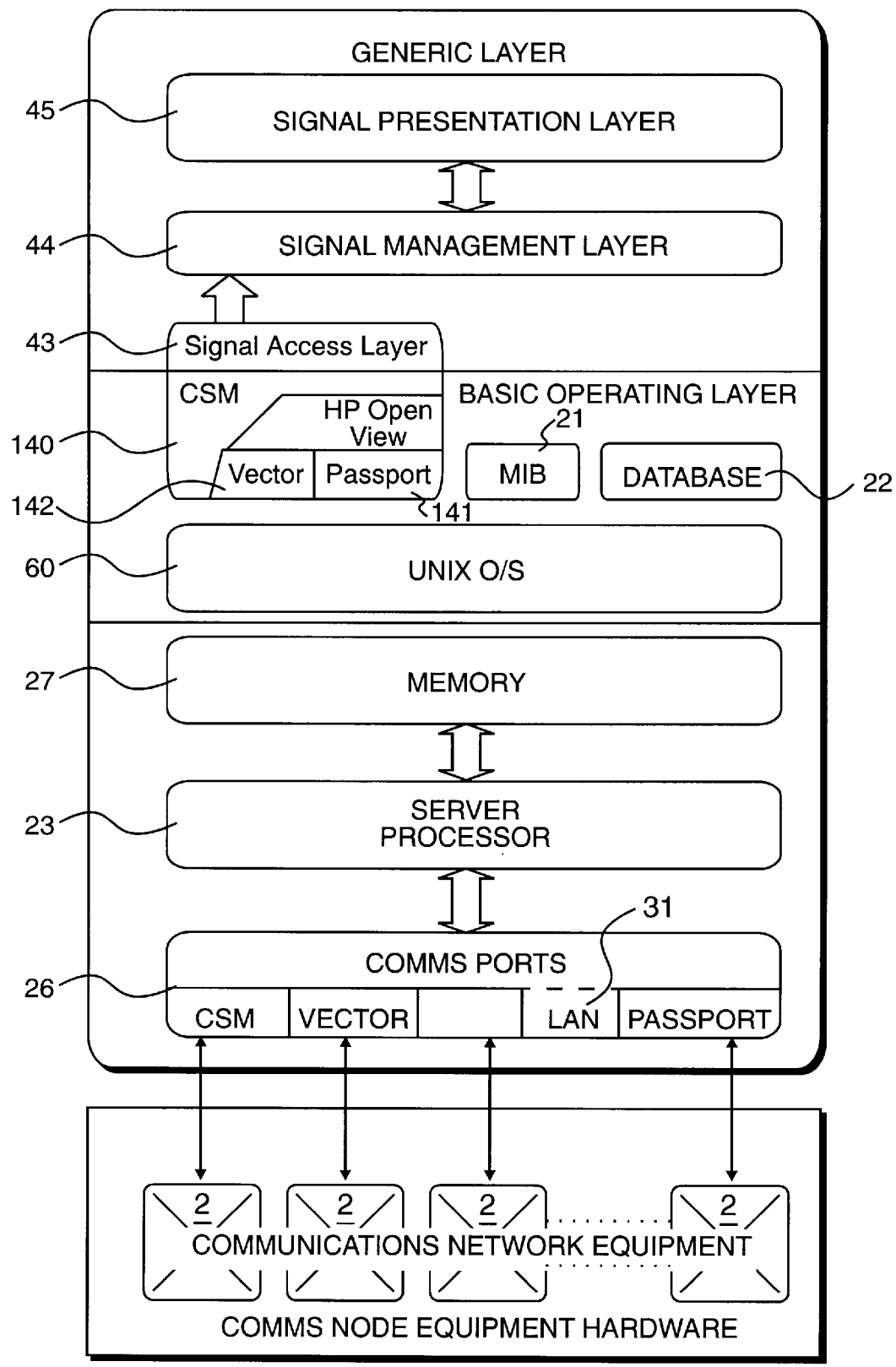
FIG. 6 illustrates schematically an overview of a hardware and software architecture of a server processing station of the network monitoring apparatus.
Figure 7:
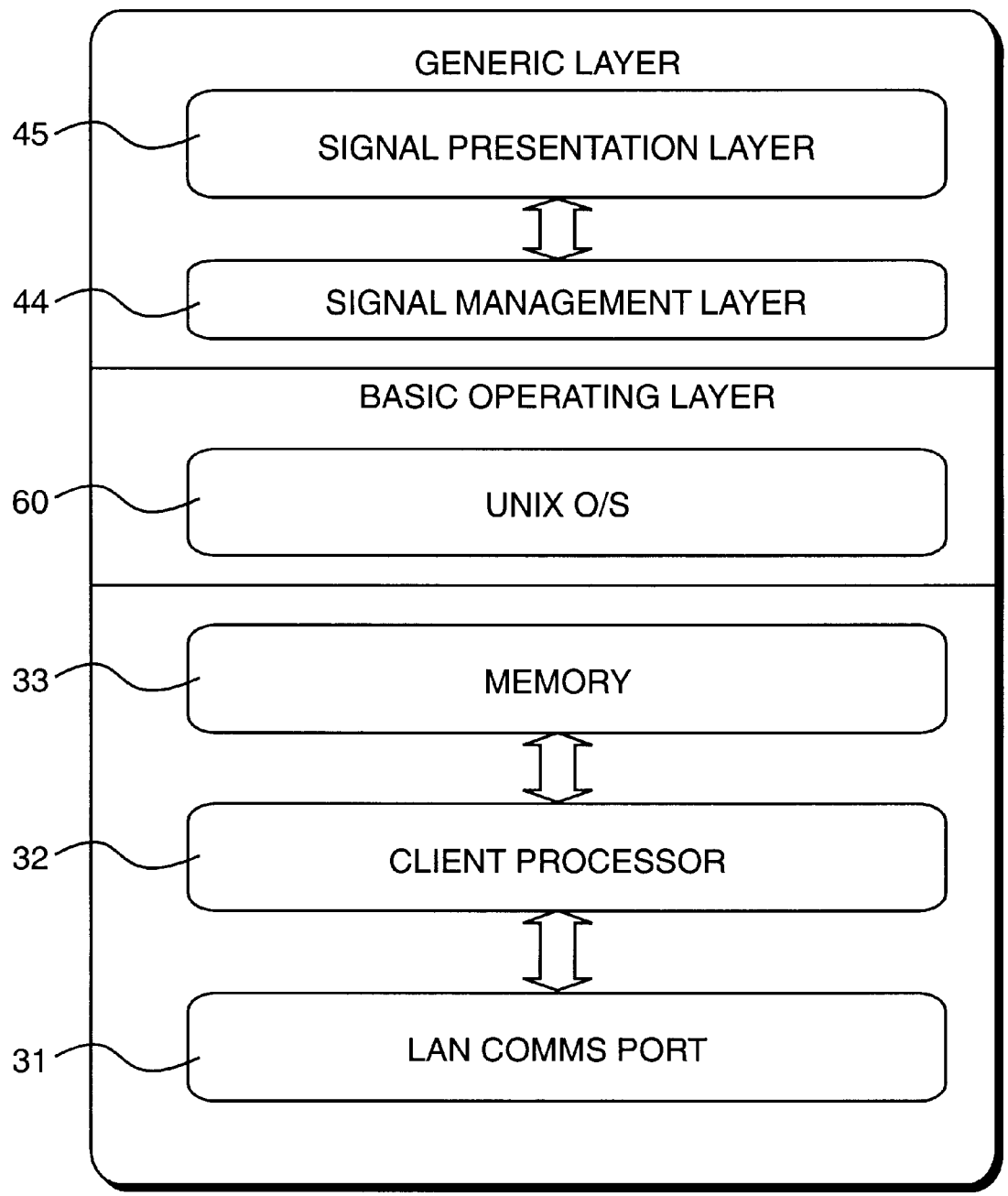
FIG. 7 illustrates schematically an overview of a hardware and software architecture of a client processing station of the network monitoring apparatus.

Referring to FIGS. 4, 6 and 7 herein a hierarchical relationship between the hardware elements of the communications network, data monitoring apparatus, and the control and data processing mechanism for the data monitoring apparatus are shown. The control mechanism comprises a set of instructions for the processors, stored as electronic signals in the memory 27. The control signals control the processors 23, 32 to operate the user interface 9 for receiving user instructions concerning network elements to be monitored, and for producing graphical displays of service and performance parameters derived from component signals received through the communications port 26 from the network elements; to control the communications input\output ports 26 for sending and receiving interrogation signals for interrogating network elements and components of network elements and for collecting component signals received from the individual components; and for determining from the component signals, element signals describing operation of network elements of the communications network. The communications ports are each configured to interface with a particular type of switch, e.g. the known Concorde switch, the known Vector switch or the known Passport® type switch of Northern Telecom Ltd.

The control signals are arranged into three separate groups 43–45, according to their main functions in controlling the processors. A first layer of control signals is denoted a signal access layer 43, a second layer of control signals is denoted a signal management layer 44, and a third layer of control signals is denoted a signal presentation layer 45. The signal access layer 43, along with a basic operating system for controlling the processors, for example a UNIX operating system 60, comprises a basic operating layer of the apparatus. Also shown are the management information base 21 and database 22 of the network manager system, which shares the server with the data monitoring system. In the preferred embodiment the network manager system comprises a Concorde System Manager (CSM) of Northern Telecom Limited.

Referring to FIG. 7 of the accompanying drawings, there is shown a hierarchical relationship between hardware elements of the client station and the control and data processing mechanism of the client station and server. Elements of the signal management layer 44 and the signal presentation layer 45, comprise a generic layer of the control and data processing mechanism of the data monitoring apparatus. A basic operating layer of the client station comprises Unix operating system 60.

Figure 8:
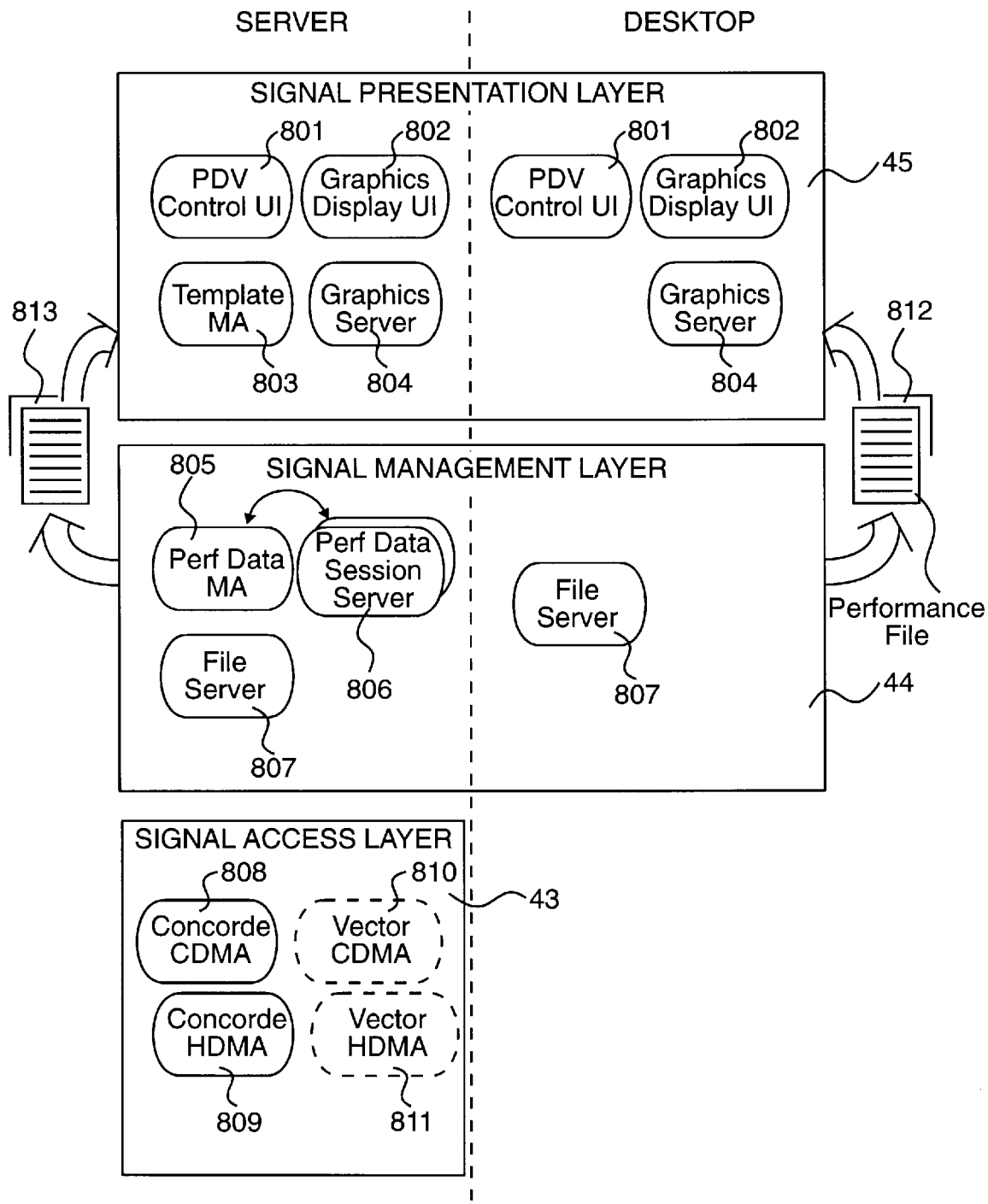
FIG. 8 illustrates schematically an internal control and data processing architecture of the network monitoring apparatus.

Referring to FIG. 8 herein there is shown an overview of the layout of each of the groups 43–45. The groups comprise control signals arranged in the memory 27, in the form of application programs in an object oriented programming language e.g. SmallTalk, C++ or the like, arranged to control the processors 23, 32 to perform processing operations on the data signals and to generate the interrogation signals and request signals.

The signal presentation layer 45 and the signal management layer 44 comprise a set of generic application programs resident in the memory 27, either on the server or on a client station. In the preferred embodiment, the signal presentation layer comprises: a control user interface application 801; a graphics display user interface application 802; a template management application 803; and a graphics server 804. The template management application 803 is resident on the server, and the control user interface, graphics display user interface and graphics server applications may be resident on both the client and the server stations.

The signal management layer 44 comprises a performance data management application 805; one or a plurality of performance data session servers 806; and a file server 807. The performance data management application and performance data session servers are resident on the server and the file server is resident on the server and the client station.

The signal access layer 43 comprises a set of management applications for interrogating the network management system to selectively read data signals from the management information base. Additionally, the management applications drive the network management system to dynamically obtain in real time component signals from the node elements themselves in response to interrogation signals generated by the management applications. The network management system obtains dynamically in real time selected component signals form the components of the switches and delivers these back to the management applications. The management applications are each specific to a particular type of node equipment, and are split into management applications for obtaining current data through current component signals, describing real-time parameters of the node equipment components, and applications for obtaining historical data from the historical data base of the network manager. For example, for a Concorde switch, there is provided a Concorde current data management application 808 and a Concorde historical data management application 809. For a Vector-type switch there is provided a Vector current data management application 810 and a Vector historical data management application 811.

Figure 9:
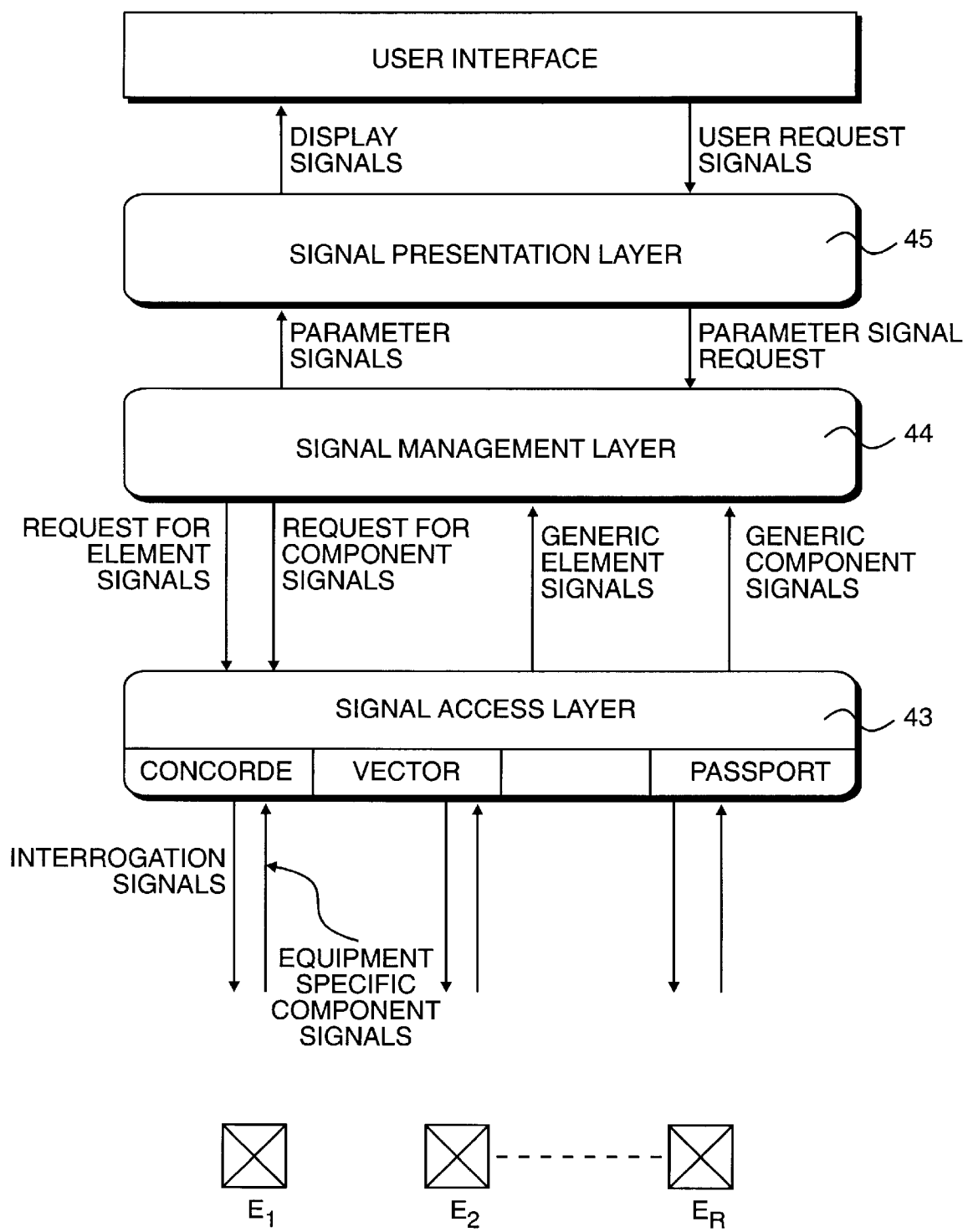
FIG. 9 illustrates a control signal and data signal hierarchy implemented by the network monitoring apparatus.

Referring to FIG. 9 herein, there is shown schematically a transfer of data signals i.e. component signals and element signals, conveying data describing the components and elements, between the signal access layer 43, the signal management layer 44 and the signal presentation layer 45. There is also shown the operation of control signals between the control layers and the network elements. The control signals include interrogation signals sent to the network elements from the signal access layer 43, for reading component signals, requests for component or element signals sent from the signal management layer to the signal access layer 32, request signals for component signals and element signals, the request signals sent from the signal presentation layer 45 to the signal management layer 44, and request signals for component signals and element signals, the request signals sent from the user interface 9 to the signal management layer 44. Data signals are passed between the signal presentation, signal management and signal access layers, and are processed within those layers.

Data signals and control signals are passed between the signal presentation layer, the signal management layer and the signal access layer by encapsulating the data signals and control signals as objects in an object oriented language. An object may comprise both a control signal and a data signal. In a preferred method, described herein the architecture of the layers 43–45 is based around a Shlaer Mellor information model which divides the signal presentation layer, signal management layer and signal access layer into a number of sub-sections which map the objects in the model onto the different layers. This is one example of implementation of the control layers 43–45 and is now described. However, the invention is not limited to implementation in an object orientated language.

Control Signal Architecture Overview

Figure 10:
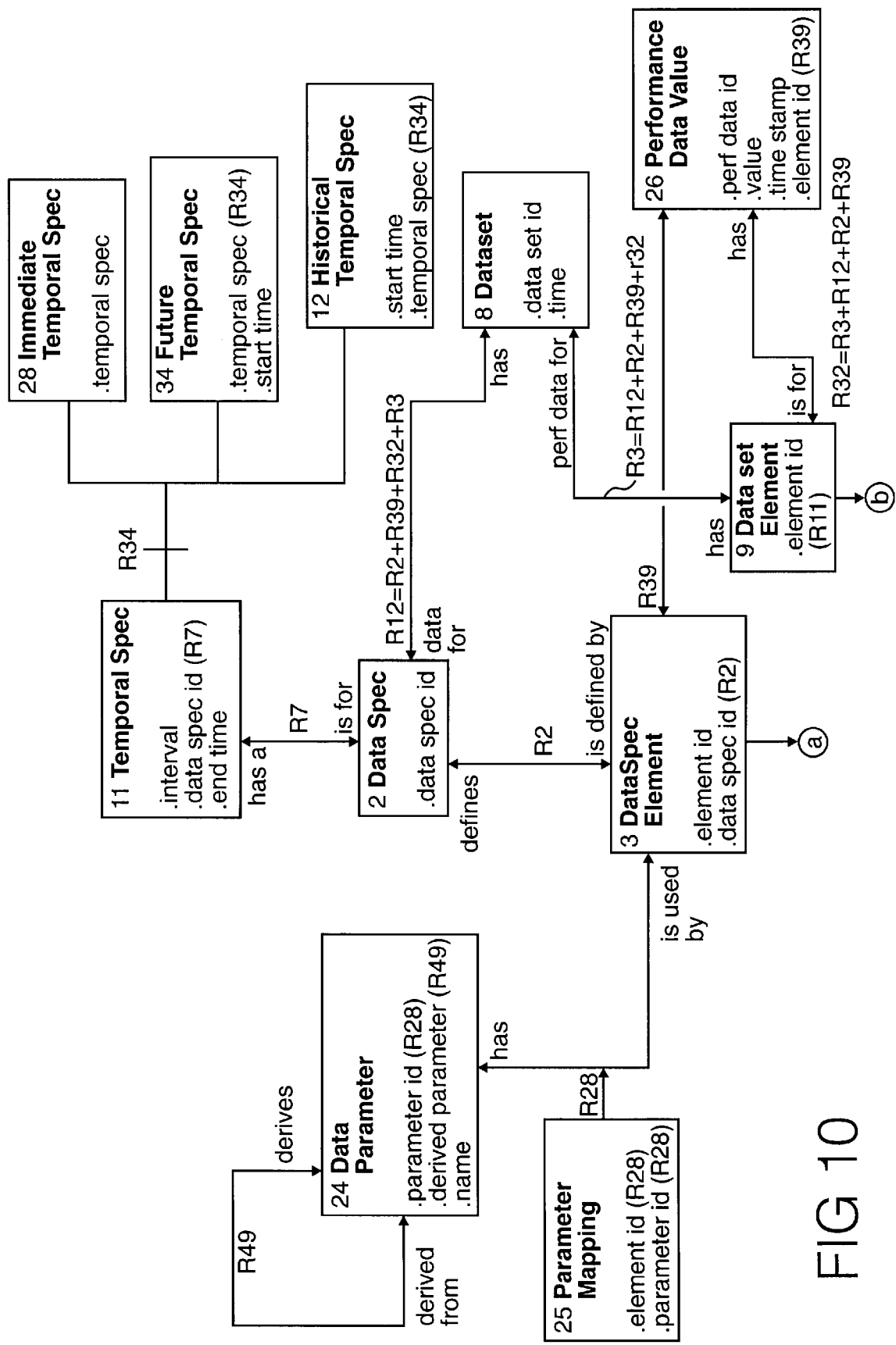
FIG. 10 illustrates an overview of a software architecture used to arrange control signals and data signals internally in the monitoring apparatus and to interrogate node elements of the network and to carry out specific processes according to the invention.
Figure 10B:
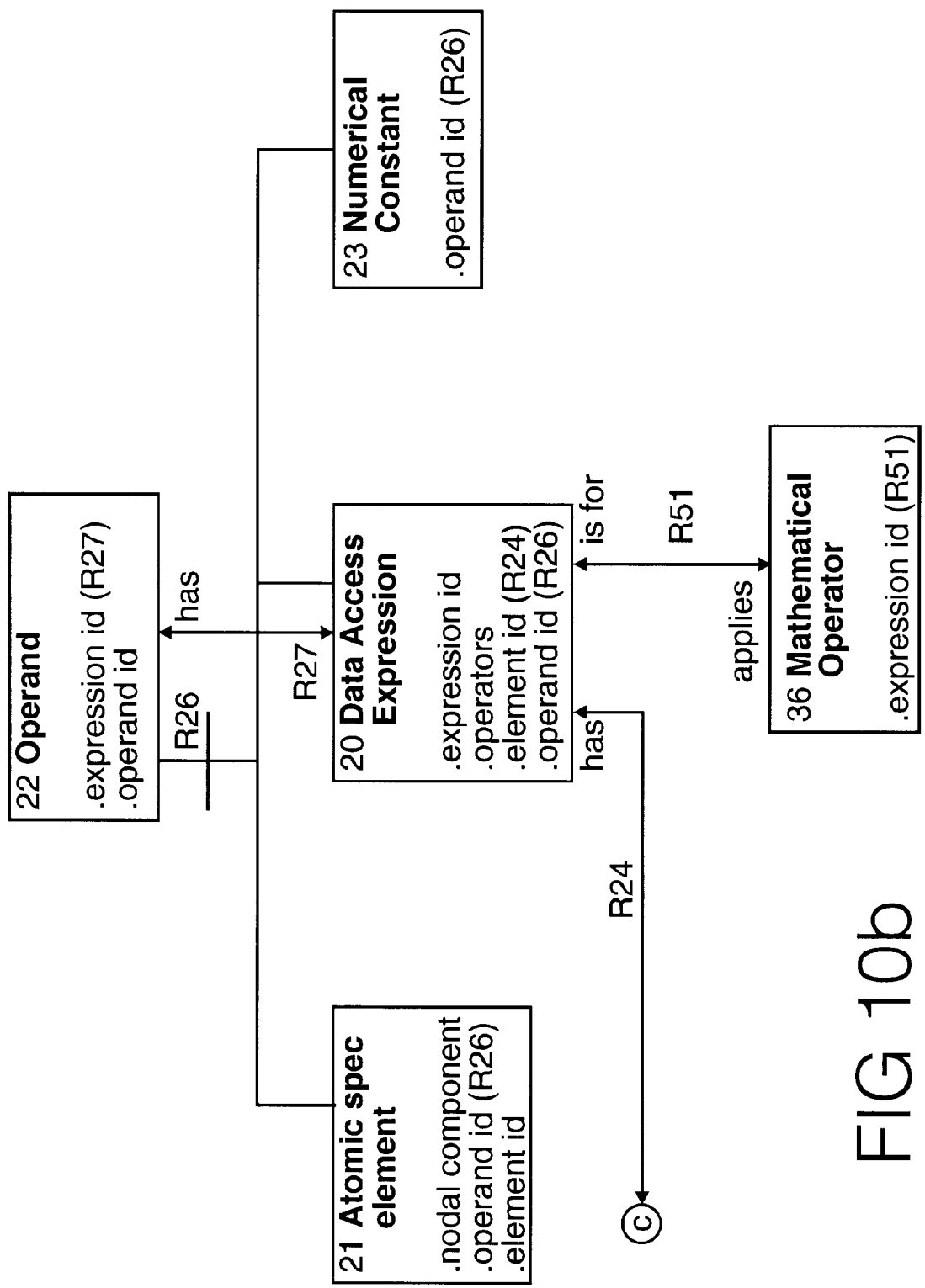
Figure 10C:
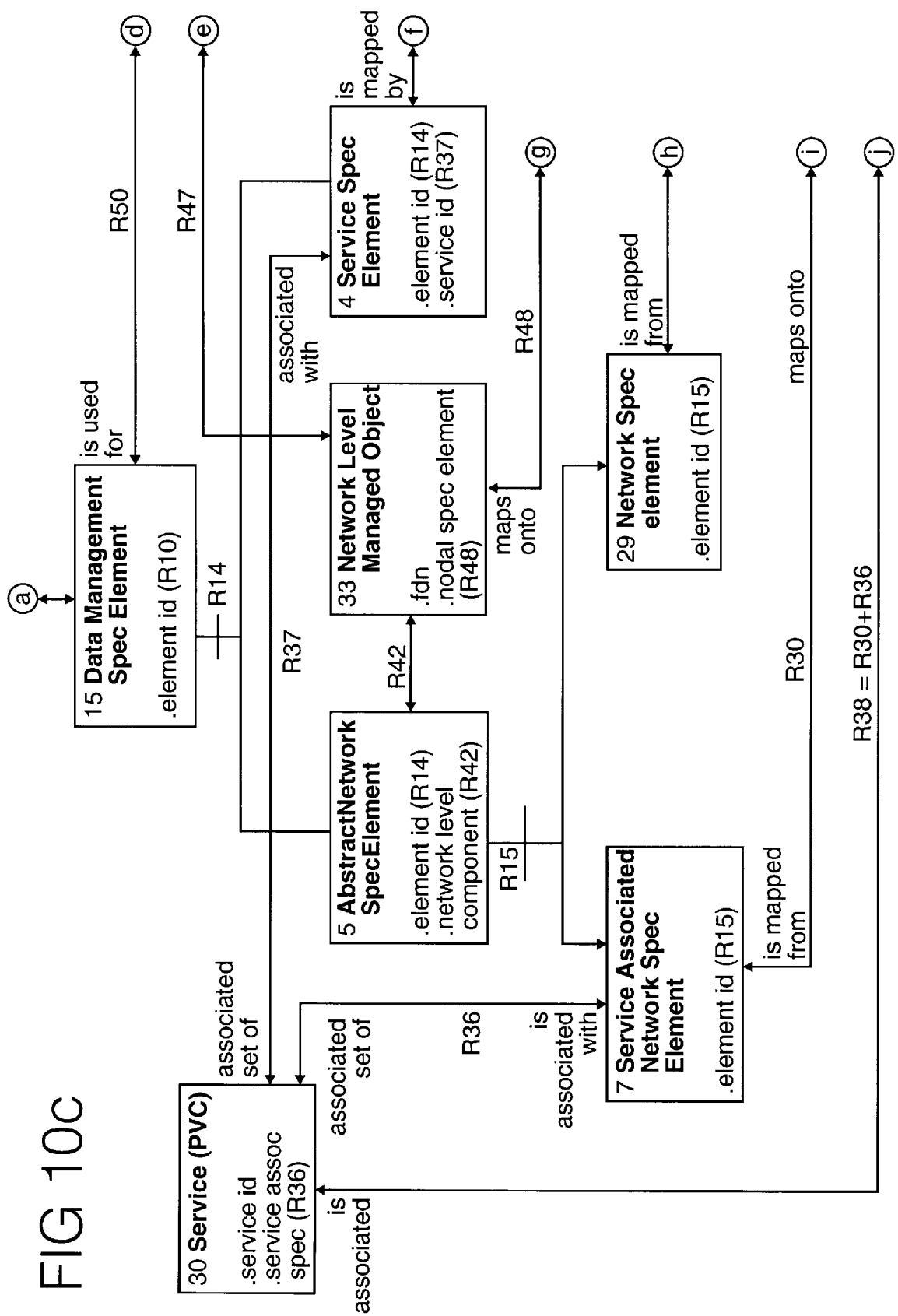
Figure 10D:
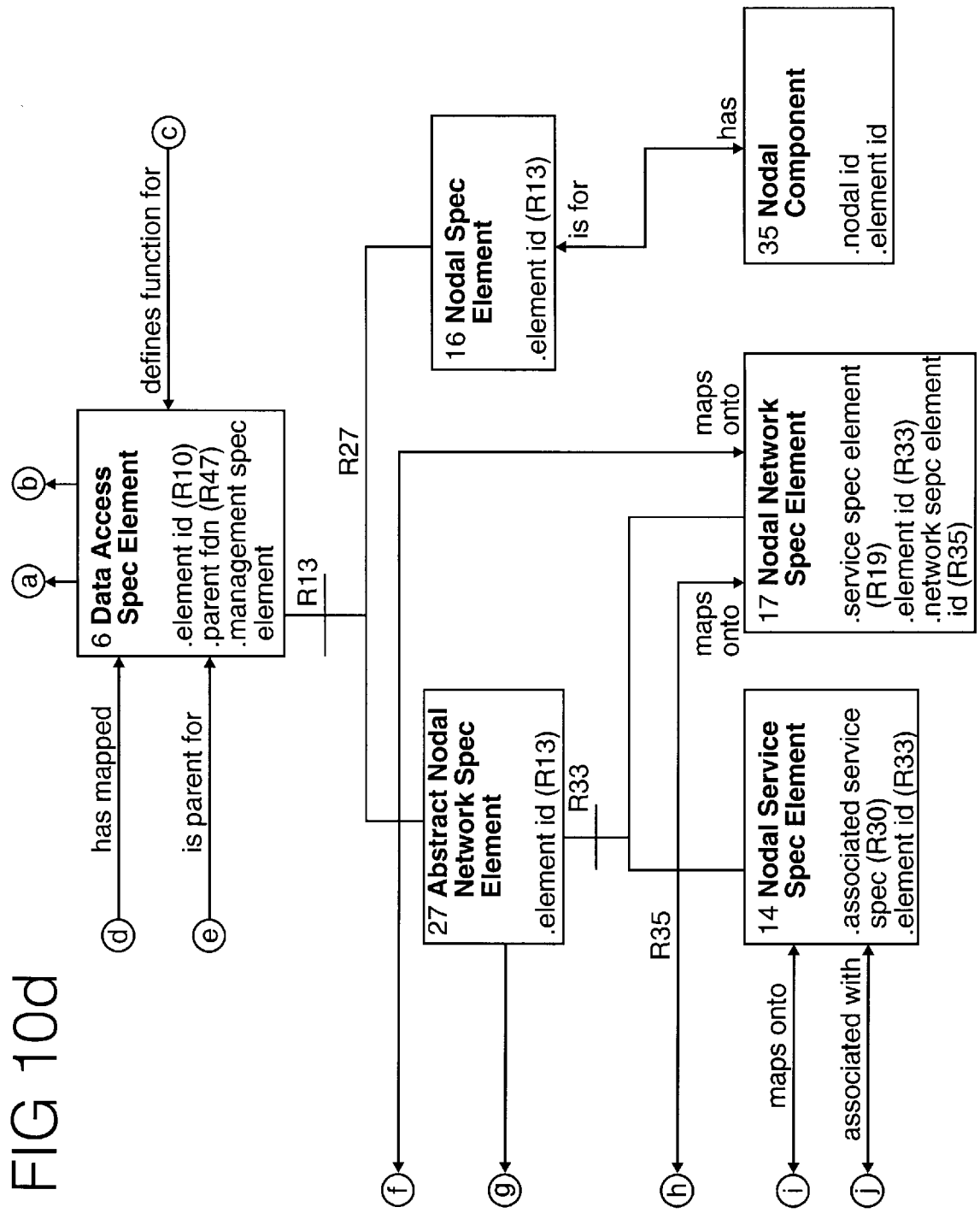

FIG. 10 herein shows an overview of the Shlaer Mellor information model architecture used to implement the signal access layer, signal management layer and signal presentation layer. Constituent objects comprising data signals and control signals of the layers are catagorised as follows, and interact with each other as described below and in general with reference to FIG. 10. The names given to the objects are arbitrary.

(i) Multi-Layer objects

Data Spec

A Data Spec object comprises a control signal portion containing a set of specification objects which specify the data that is to be collected from the network. The signal presentation layer creates objects of the Data Spec type which are passed to the signal management layer as a request signal for the data collection process to be started.

Temporal Spec

A Temporal Spec object comprises a control signal portion which holds the temporal information associated with a request for the data collection process to start, as conveyed by a Data Spec object. The Temporal Spec object has a polling interval attribute, which is a periodic interval at which the node or link element hardware will be polled for data. The Temporal Spec object also defines an end time so that the data collection session, for collecting component signals, can be automatically terminated after a defined period of time has elapsed.

Historical Temporal Spec

A Historical Temporal Spec object comprises a control signal portion which is a sub-type of the Temporal Spec object, and defines a historical point in time from which component signals are to be collected from the Network Element. Use of a Temporal Spec and a Historical Temporal Spec object enables both historical and current data to be collected within a single data collection session. If the end time defined in the Historical Temporal Spec object has not already elapsed then the data collection session will begin to poll the node element hardware for real-time data signals after retrieval of the historical data signals from the node element hardware.

Future Temporal Spec

A Future Temporal Spec object is a sub-type of the Temporal Spec object, and defines a future point in time when data signal collection is to begin. Collection of data signals at a predetermined future time can be instructed by the use of a Future Temporal Spec object. The Future Temporal Spec object defines a start time and an end time for data signal collection from the node elements.

Immediate Temporal Spec

An Immediate Temporal Spec object instructs data signals to be collected from the node element immediately, and instructs termination of collection at an end time specified in the Immediate Temporal Spec object.

Data Parameter

A Data Parameter object contains the information concerning a performance parameter for which data signals are to be collected. A Data Parameter object also has other attributes that can be used to specify the way in which the data signals relating to a performance parameter are processed in the signal access layer.

(ii) Signal Management Layer Objects

Data Management Spec Element

A set of Data Management Spec Element objects are created by the signal presentation layer and passed to the signal management layer. The Data Management Spec Element objects are generic, in that they specify node equipment or individual components of node or link equipment in a format which is understandable by all applications of the signal access layer. Individual node equipment cannot understand a Data Management Spec Element object without conversion into an equipment specific signal by the signal access layer. One of the functions of the signal management layer is to map the information contained in the Data Management Spec Element objects into lower order interrogation signals and lower order objects (Data Access Spec Element objects), which provide access to actual component signals available from the components of the node and link equipment.

Service Spec Element

A Service Spec Element object is a sub-type of a Data Management Spec Element. The Service Spec Element object defines a set of performance parameters which are to be monitored on a network service, such as a permanent virtual circuit (PVC) or a permanent virtual path (PVP). Since monitoring is by collection of component signals from individual components of node elements, it is not possible to directly measure data traffic in a customer service flowing along the network. Data concerning a service is obtained by inspecting component signals generated from individual components which support a particular service. For example, where a service uses three individual switches and two links, monitoring of the service is achieved by a collection of component signals from each switch.

A Service Spec Element object maps onto a Nodal Network Spec Element object in the signal access layer.

Network Spec Element

A Network Spec Element object is a sub-type of Data Management Spec Element object which defines a set of performance parameters which are to be monitored on a network element such as a switch or a link. A set of Network Spec Element objects may be mapped to a Service Spec Element object described above.

Service Associated Network Spec Element

A Service Associated Network Spec Element object defines a set of performance parameters to be monitored from individual components of network elements with respect to a set of services. The Service Associated Network Spec Element object forms the basis of the service level monitoring of a network. The performance of a network element can be measured with respect to a specified service which will only measure the performance data on the individual component parts of the node element or switch, that the service connection traverses.

(iii) Signal Access Layer Objects

Atomic Spec Element

An Atomic Spec Element object is used internally by the signal access layer to specify a single performance parameter on a single component. A plurality of Atomic Spec Element objects are used to gather data from individual components of the node elements. An Atomic Spec Element object is a lowest level of generic component signal. Individual component signals received from the components of a network element are equipment specific, and may be converted into an Atomic Spec Element object by encapsulating or translating the equipment specific component signal received from the component of the network element into an Atomic Spec Element object. The Atomic Spec Element object is so called because it is atomic in that the performance parameters are directly readable and do not have to be computed. The signal access layer gathers data by collecting Atomic Spec Element objects, relating to individual components of node elements.

Data Access Spec Element

A Data Access Spec Element object comprises a signal to an interrogation server to interrogate a particular component of a node equipment to transmit a component signal concerning the interrogated performance parameter. The Data Access Spec Element object is the mechanism by which an interrogation server can establish whether it is instructed to take any action by a signal from the data signal management layer. Each Data Access Spec Element object references a parent index object.

Parent Index

A Parent Index object is an object describing a list of all the components. A Parent Index object is fundamental to the operation of the signal access layer. The signal access layer comprises several different management applications, 808–811 each supporting a different type of node element equipment, e.g. a different switch type. The management applications in the signal access layer have specific interfaces which enable them to interrogate individual components of a network element. The Data Access Spec Element object is equipment specific, since the information contained in the Data Access Spec Element object is dependent upon the switch type and the performance parameters which can be monitored by receiving component signals from the particular switch. Each management application uses the Parent Index object to identify performance parameters that it is capable of processing.

Abstract Nodal Network Spec Element

An Abstract Nodal Network Spec Element object specifies components that have a one-to-one correspondence with an instrumentation point on an item of equipment, for example a channel termination point (the end points of a permanent virtual circuit), a link end point, or an individual switching element.

Nodal Network Spec Element

The Nodal Network Spec Element object maps to a Network Spec Element object or a Service Spec Element object. The Nodal Network Spec Element object inherits the behaviour of the Abstract Nodal Network Spec Element object.

Nodal Service Spec Element

A Nodal Service Spec Element object is a sub-type of Abstract Nodal Network Spec Element object. The Nodal Service Spec Element object supports an additional relationship to enable navigation back to the Service Associated Network Spec Element object, and the set of services that are associated with that object. The Nodal Service Spec element inherits the behaviour of the Abstract Nodal Network Spec Element.

Data Access Expression

A Data Access Expression object is used to represent a tree-like mathematical expression. The mathematical expressions are built up by the signal access layer and subsequently evaluated or interpreted as part of the implementation of the nodal level computations. Element level computations comprise computing a plurality of component level signals converted to generic format into a single element level signal, in the form of an object in generic form describing the plurality of component level signals. For example, the relationship between the component signals and element signal may be that the element signal is a simple summation or averaging of the component signals. In this case, the Data Access Expression object would represent a mathematical expression implementing a simple summation or averaging.

On the other hand, a relationship between a plurality of component signals and an element signal may be that the element signal is a probabilistic function of the plurality of component signals. In this case, the Data Access Expression object would implement a complex mathematical probabilistic expression for mapping the component signals contained as Atomic Spec Element objects to an element signal contained in the form of a Data Management Spec Element, a Service Spec Element or a Network Spec Element.

The Data Access Expression object comprises an operand object, which can be either in the numerical constant, or in a Data Access Expression object, or an Atomic Spec Element object. The operand object, together with a set of operators in the Data Access Expression object form an evaluation tree which is efficient to evaluate.

In the preferred embodiments, the above Shlaer Mellor information model is implemented in the programming language SmallTalk, although other object oriented programming languages may be used.

Detailed Method of Operation

Referring to FIGS. 6 to 12, the functioning of the control groups 43–45 are summarised as follows:

Signal Presentation Layer

The signal presentation layer 45 controls the operation of the user interface 9 and the generation of visual displays on the visual display unit 10, as well as controlling the conversion of user requests, entered via the keyboard 11 and pointing device 12 in conjunction with the visual displays into request signal objects, requesting component or element signals from the signal management layer. The user controls a monitoring session using a Session Manager display in FIG. 11. Using the Session Manager Display, individual services provided across a network, for example tracing the path of an individual call connection between first and second customer sites connected to first and second node elements can be monitored. An example of a display of the Session Manager display 110 on the display device 6 is shown in FIG. 11 herein. The Session Manager display is used to instruct a signal collection session for collection of component signals from the network elements. Using the Session Manager display, a user can specify a period over which a service is monitored. The user can specify one or a plurality of connections of the communications network and be presented with a resource display 111 identifying the individual node elements which support the services between those communications network customers. A user may reveal a path of a service through individual elements, via a component display 113. The user can also specify start and end times for a monitoring session, on a timing display 114. The user may conduct a number of monitoring sessions at once which may be listed on a session display 112.

The signal presentation layer can handle displays for instructing signal collection sessions from a plurality of users at once, due to the distribution of the signal presentation layer between the server processor 23 and one or more client processors 32. Each user sets the operations to be monitored using a separate Session Manager display.

A user of the user interface can display, under control of the signal presentation layer a Template Manager Display through which the user can select whether he or she wishes to monitor individual node elements or link elements, or monitor components within the node elements. Monitoring of the parameters at either the network level, service level or component level can be selected by a level selector 123 in the Template Manager Display.

At the Component level, an individual switch can be selected, and the Template Manager Display displays all the parameters on the selected switch for which data is available from the historical database, or which can be interrogated in real time.

With the level selector set at the Network level, a set of switches may be selected, and the Template Manager Display displays all the parameters for which historical or real time data can be read from the set of switches.

With the level selector set at the service level a connection may be selected and the Template Manager displays a list of all parameters which are supported by that connection.

Figure 12:
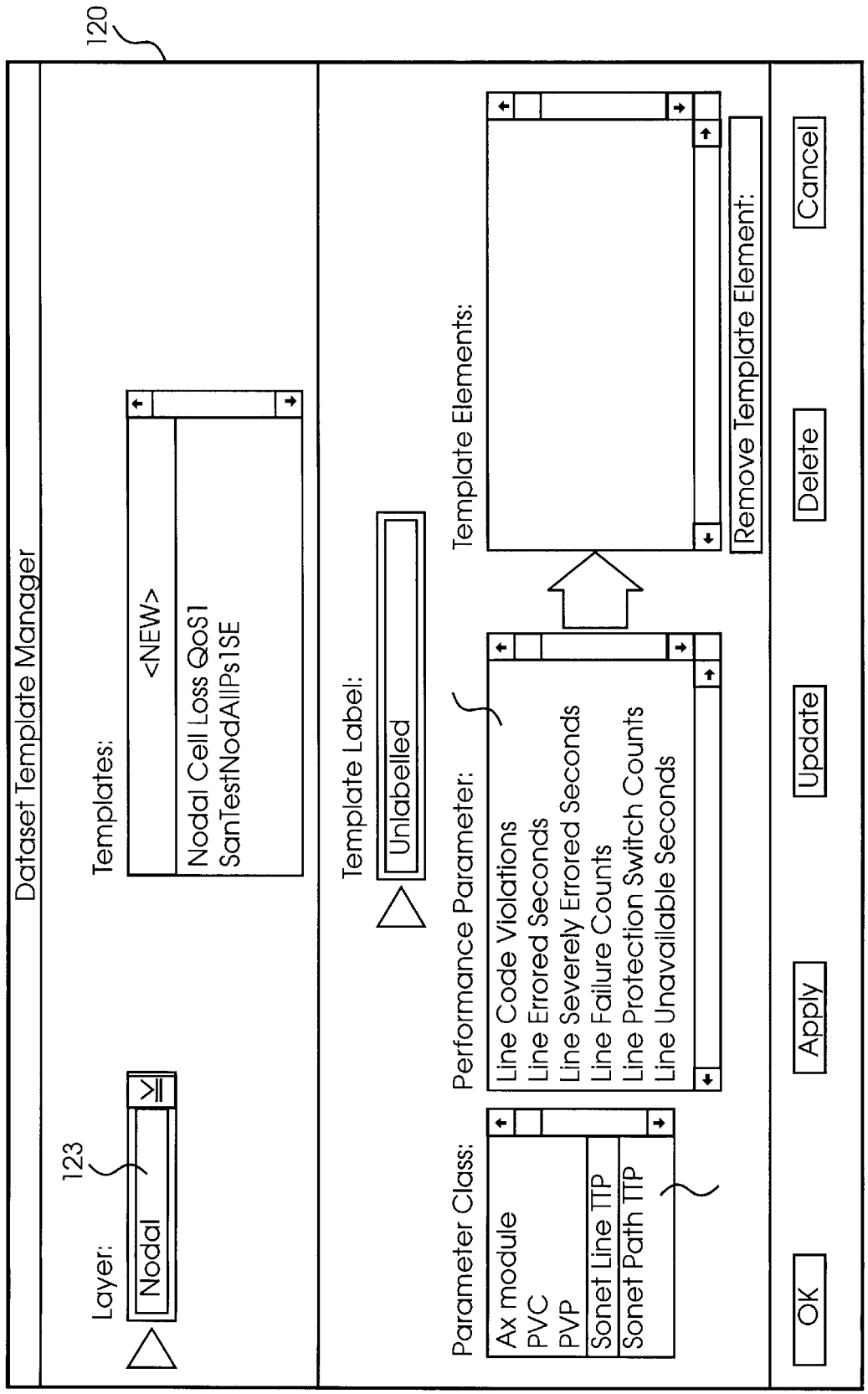
FIG. 12 illustrates a template manager display on a display device of the monitoring apparatus.

An example of a Template display 120 on the display device 6 is shown in FIG. 12 herein. The user can select through a performance parameter select display 121 of the template display a performance parameter to be monitored. The performance parameters for which component signals are supported on each node element are recorded in the memory 27. The Template Manager Display 120 presents the user with a selection of performance parameters supported by a selected node equipment type and enables the user to construct and store a template of instructions for often repeated monitoring operations.

Sets of individual parameters are grouped into classes, and different node or link equipment types support different classes of parameters. The class of parameter to be monitored, with reference to the equipment type can be selected in a parameter class selector 122 which is part of the Template Manager Display 120. Examples of parameter classes include sets of parameters supported by an Ax card of a Concorde switch; a permanent virtual circuit (PVC) parameter; a permanent virtual path (PVP); a Sonet line TTP; and a Sonet path TTP. Examples of performance parameters include line code violations, line errored seconds, line severely errored seconds, line failure counts, line protection switch counts, line unavailable seconds, and cell discard. The particular parameters to be monitored for any particular type of node element depend upon the component level signals available from the node element.

Upon receipt of an input from the user interface 9, in conjunction with the Session Manager and Template Manager displays, the signal presentation layer 45 generates an appropriate request signal requesting component and element signals from the signal management layer 44. The requested signals may be component signals specifying a performance parameter of individual specified components, or may be element signals concerning network level parameter signals, identifying an overall performance of one or a plurality of network elements in relation to a user specified performance or service parameter.

Signal Management Layer

The signal management layer is distributed between the server processor 23 and one or more client processors 22, as shown in FIG. 8. For each user session carried out to monitor the network, and collect component signals, there is created a separate performance data session server application 806.

The signal management layer 44 receives the request signals, input by one or a plurality of users of the monitoring apparatus, in the form of objects from the signal presentation layer. The signal management layer handles multiple sessions of signal requests from a plurality of users. For each session, a separate performance data Session Server application 806 is created. The signal management layer receives the appropriate request signals requesting component and\or element signals in the form of objects and co-ordinates the collection of the requested signals from each of the node elements specified in the signal request. For example, at the service level where a user wishes to inspect first and second switches, and a link there between in respect of a certain performance parameter the signal management layer collects the appropriate network level element signals or service level component signals corresponding to the appropriate network elements from the signal access layer, stores the network level signals or component level signals as appropriate for each specified node element and compiles the collected signals into a memory file, shown schematically in FIG. 8 as a performance file 812 in the file server 807, which is accessible to the user. Where there are multiple users of the monitoring apparatus, the signal management layer may compile performance files 813 which are made available to the server processor, and thereby made available to individual users of the apparatus via their client stations, or may compile performance files 812 available for inspection only by a specified user in response to a predetermined authorization code signal.

The signal management layer additionally manages the breakdown of request signals from the signal presentation layer which specifies network-wide collection of element signals concerning a particular parameter. The signal management layer breaks down a network-wide request for data signals concerning a parameter into a plurality of individual request signals addressed to each type of element, and specifying the parameter. For example, a request for data is broken down into Vector request signals, Concorde request signals and Passport request signals where there are Vector, Concorde and Passport type switches in the network. The signal management layer handles the sending of the individual requests for element signals to the appropriate elements at their respective network addresses, by sending the request signals to the signal access layer. The signal management layer also maps the responses from the request signals back to the original request of the user and stores the responses, comprising component signals and\or element signals into a user file corresponding to the original request.

The signal management layer manages requests for collection of component or element signals over a specified time window, specified by the signal presentation layer in the form of the Temporal Spec objects, either historic, immediate or future, and is responsible for notifying the signal presentation layer of new sets of component or element signals which become available from elements, and for polling elements at predetermined time periods compatible with the node or link equipment comprising the element. For example, a switch element may respond to polling every 15 or 30 minutes, and the signal management layer is responsible for sending signals to the signal access layer in order to collect the component or element signals at these intervals.

Additionally, the signal management layer stores the parent objects describing the relationship between node elements and link elements in the communications network. The signal management layer supplies signals to the signal presentation layer, identifying connections between node elements and links elements for tracing call connections through the communications network.

The signal management layer is sub-divided into the set of application layers, comprising a performance data management application 805, a performance data session server 806, and a file server 807. The file server is split into a server processor based file server, and a client processor based file server as shown schematically in FIG. 8 herein.

The performance data management application 805 is responsible for servicing request signals from the signal management layer concerning:

a request for a snapshot of current performance data of specified elements or components;

a request signal for a set of historical data concerning specified elements or components;

a request for periodic polling of current performance data; and a request for a set of historical data updated with periodic polling of current data.

The performance data management application does not directly perform the collection of the component signal and element signals, but delegates this task to the performance data session server 806. The performance data session server 806 is an application responsible for collecting component signals and element signals from the data access layer. The storage of component signals and element signals in the performance files 812, 813 is controlled by the performance data management application 805, which stores current and extracted historical data in the performance files 812, 813.

The performance data management application also controls the visibility of data collection sessions by individual client station users, so that a user running a session on one client station does not have access to the data collection sessions of another user.

A performance data session server 806 is created by the performance data management application each time a request for a new signal collection session is received by the performance data management application from the user. The performance data session server performs the collection of the operational information, by instructing the signal access layer to collect component signals and element signals. The performance data session server also coordinates the data collection for both the current data and historical data.

The performance data session server provides:

requests for data on multiple switches at a time;

requests for combination of current and historical data, including polling for current data over time;

retrieval of component signals and element signals for the respective switch element types from the signal access layer;

collation of responses from the signal access layer into a single response; and controlling the destination of received component and element signals for storage.

Both the signal presentation layer and the signal management layer comprise a generic layer of control signals. By generic, it is meant that the signal presentation layer and signal management layer handle component and element signal objects describing operational parameters which are common to a number of different node element equipment types. Component signals and element signals stored and operated on by the signal presentation layer and signal management layer are in a common format, for example as objects in the SmallTalk programming language. The signal management layer receives objects from the signal access layer, which actually collects the component signals and element signals from the different node element equipment types using protocols and interrogation signals which are specific to each individual node element equipment type.

Signal Access Layer

The signal access layer is partly a non-generic control layer, in that the interrogation signals transmitted by the signal access layer to the network elements are not in a uniform common format, but are in a format specific to the particular node element equipment types addressed.

The signal access layer receives requests for element signals and\or component signals from the signal management layer 44. The signal access layer 43 provides access to the actual component signals generated by the network elements in response to requests for component signals or element signals. For example, the signal access layer 43 will receive a request for component signals specifying for example signals concerning parameters of individual components of a first node element E1. The signal access layer will convert this request into a plurality of interrogation signals directly interrogating the appropriate plurality of components of the network element E1. The network element generates component signals which are transmitted over the communications link 5 to the signal access layer. The signal access layer may then encapsulate the component signals as objects and relay the component signals to the signal management layer 44 in response to the request for component signals.

The signal access layer 43 also provides element signals to the signal management layer in response to a request signal from the signal management layer 44, requesting one or a plurality of element signals. For example, the signal management layer 44 may specify a request, by means of an appropriate request signal sent to the signal access layer 43, specifying node elements E1, E2, E3 and E4, and the parameter of cell discard. The signal access layer converts the request for element signals at the network level concerning the parameter of cell discard for elements E1–E4 into individual interrogation signals for collecting component signals of each line card and buffer component of elements E1–E4. Each component of elements E1–E4 generates a corresponding component signal which is returned over the communication link 5 to the signal access layer. The signal access layer then compiles the plurality of component signals received from each component of each addressed network element E1–E4 into a set of network level element signals representing the overall performance of each element E1–E4 with respect to the specified parameter, e.g. the parameter of cell discard. The network level element signals are created in the form of objects, e.g. a Nodal Network Spec Element object. The signal access layer is the layer where a specific knowledge of the switch is located, and the signal access layer breaks down a network level request into individual requests for component signals, receives the component signals and compiles sets of component signals into element signals.

Since the number of individual components in each element is large, for example a Concorde switch may have 408 different buffer locations, to compile a network level element signal for one node element requires collection and processing of a large number of component signals.

Figure 13:
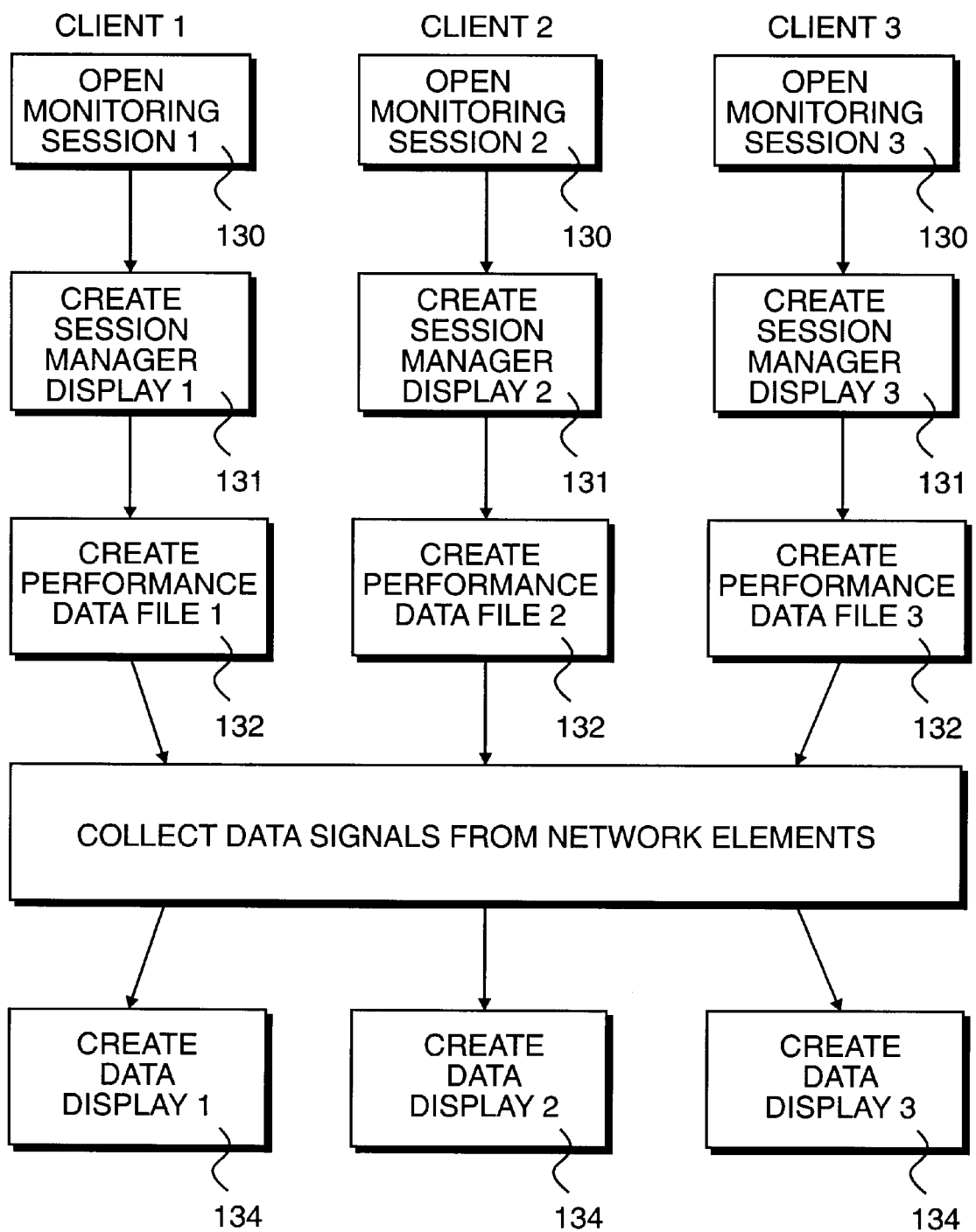
FIG. 13 illustrates a process for generating a signal describing an overall cell discard operation of a network element from a plurality of signals describing cell discard operations of individual components of the network element.
Figure 14:
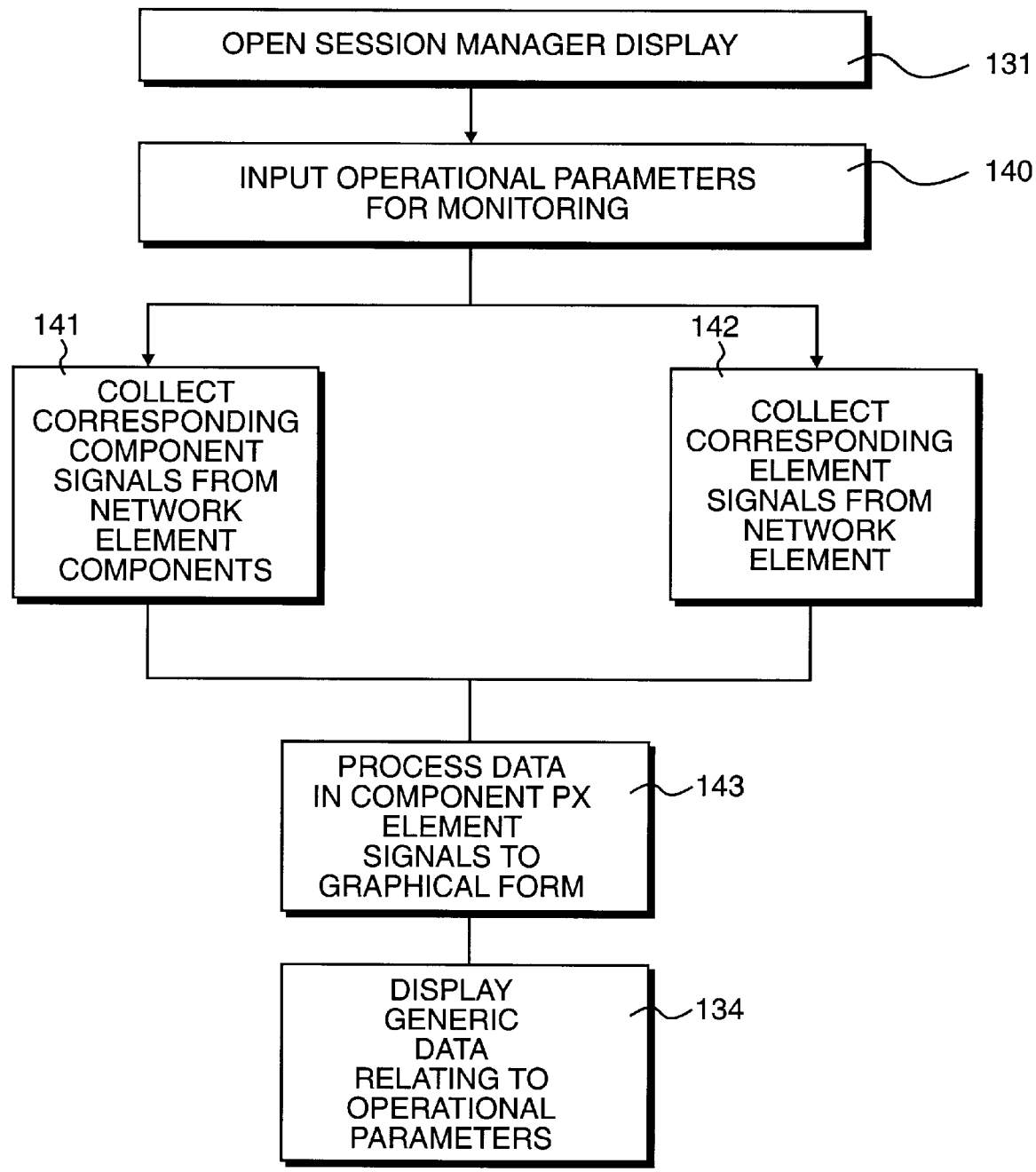
FIG. 14 illustrates a process for multi-user data monitoring session.

Referring to FIG. 13, there is summarised a process of operation of data monitoring sessions for a plurality of users of the apparatus, and in FIG. 14 there is shown a process for one user. Each user can operate a client station to perform one or more data monitoring sessions by opening a monitoring session in step 130. In each case, a session manager display is opened in step 131 and a performance file is opened in step 132. Operational parameters to be monitored in the monitoring session are input in step 140, and in steps 141 and 142 component and element signals corresponding to selected network elements and components of those elements are collected for each user. Collection of the component and element signals for all users is handled by the signal access layer resident on the server, as described herein. Data from the component signals and element signals is processed in step 143, prior to display of resultant data relating to the components and elements in steps 134, for each user. Each user is presented with an individual graphical display of selected performance parameters for each monitoring session. The performance parameters may be converted to a generic format prior to display, in which format comparison between different types of switch may be made on relative grounds. For example, a generic display may present that a switch is working at a percentage of maximum specific cell through put capacity, or is incurring overall a certain value of cell discard per connection.

Conversion of Component Signals to Element Signals

Figure 15:
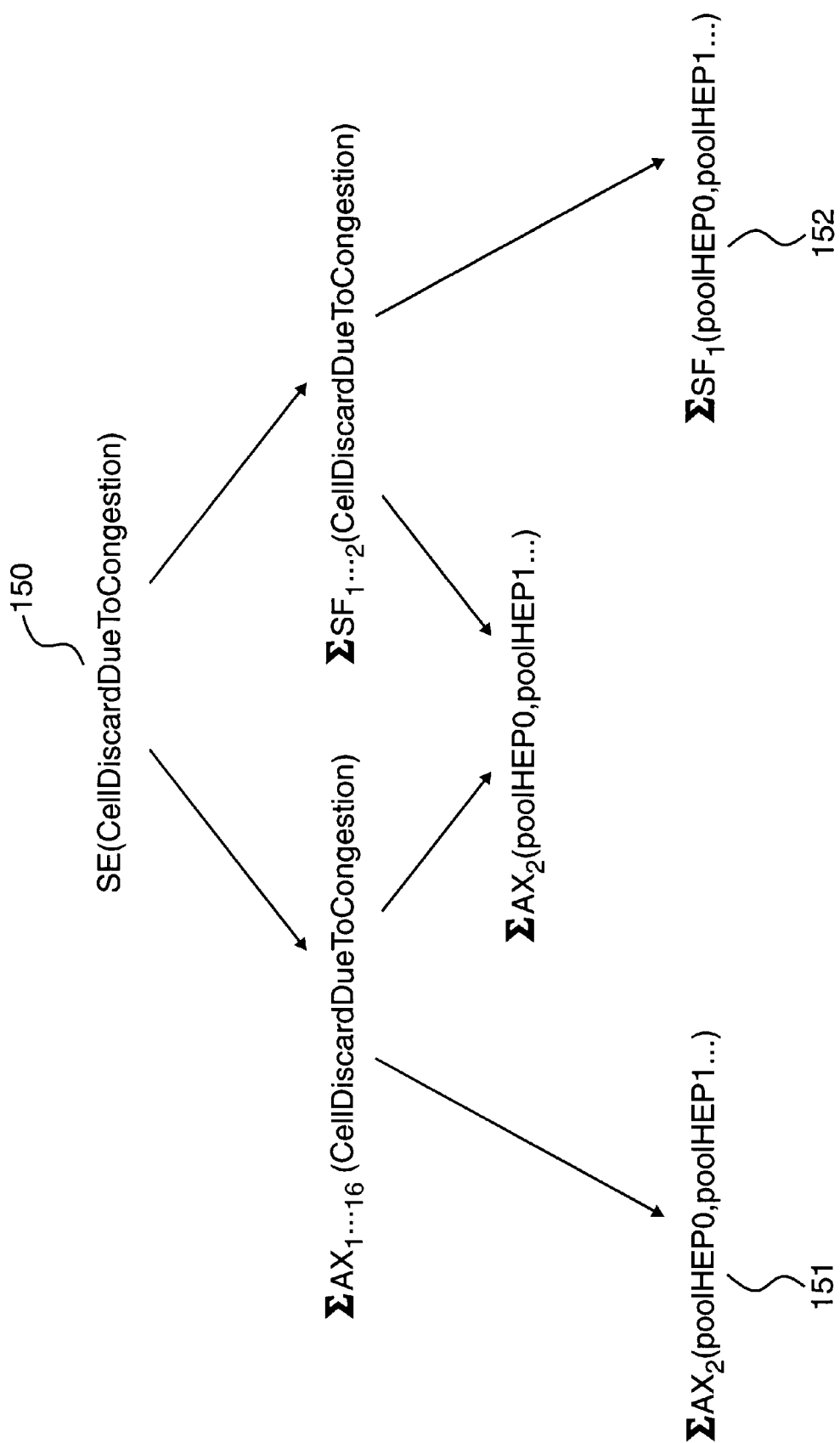
FIG. 15 illustrates a process for each user in the multi-user session of FIG. 14.

Referring to FIG. 15 herein, as an example, compilation of a network level element signal 110 SE (cellDiscardDueToCongestion) involves summation of component level signals 151, received from each buffer component on an Ax card of a Concorde switch for each of the 16 Ax cards in the Concorde switch, as well as summation of the plurality of individual component signals 152 received from each individual component of the active switch fabric card, for each of the two switch fabric cards in the Concorde switch. In the example of calculating the cell discard for a Concorde switch, all cell pools of the Ax cards and switch fabric each individually generate component signals containing information on the cell discard rate of each individual pool. The individual component level signals are compiled by a simple summation in order to arrive at an overall measure of cell discard for the switch, which is transmitted as an element signal to the signal management layer. The overall cell discard for the network element may be specified as a rate of cell discard per second for the whole switch. The element signal is a measure of the overall operation of a network element. At the network level, the performance of individual components of the network element are taken into account only by virtue of their effect on the overall performance of the element. For example, if a switch has a plurality of individual cell pools, and a small number of those cell pools are malfunctioning so as to produce cell discard continuously, if the number of malfunctioning cell pools are small compared to the overall number of cell pools, then the network level parameter signal for the parameter of cell discard may show only a small amount of cell discard for the switch. At the network level it would not be possible to determine whether the small amount of cell discard for the switch was due to a small amount of cell discard in each pool, or to no cell discard in most pools but heavy cell discard in a few pools.

To look into the performance of each component of the network element would require inspection of each component signal. Inspection of the individual component signals would reveal, in the example above, that most cell pools were operating efficiently, but a few cell pools had heavy cell discard.

The example shown in FIG. 15 illustrates one example of an element signal describing an overall performance of a network element in relation to a single parameter, in this case cell discard. Other element signals relating to the performance of an element as a whole in relation to a selected parameter may be compiled using more complex mathematical functions, or probability expressions. The expressions used to compile a plurality of component signals into an element signal are contained in the data access expression objects described herein above.

Operation parameters of node and link elements are described in generic format at the network level. Network level operational parameters represent an overall view of an element as a whole, and enable different node element equipment types to be compared with each other with respect to a specified operational parameter. For example, in the case of cell discard, the network level operational parameter may be given as a cell discard figure of cells discarded per second. This allows direct comparison of cell discard per second between different switch types having differing architectures.

Collection of Component Signals

Since in general the network comprises a number of different types of network element, each network element may respond to a different signal protocol or signal type in order to generate component signals. To accommodate each different type of node element, the signal access layer 43 comprises a plurality of individual node element servers shown schematically in FIG. 16. Each element server may comprise a set of dedicated hardware elements 160, 162 for receiving component signals from the individual components of the network elements, and for sending interrogation signals in a form which are readable by the specific equipment type comprising the network element addressed, and one or more application programs for controlling the hardware. For example, each individual network element server converts component signals in the signal protocol specific to the particular node equipment addressed, into component signals in a uniformly readable format, for example as an object in the programming languages, C++ or SmallTalk, in which form they may be compatible with the signal management layer, or compiled into element signals by the signal access layer. Each network element server is specifically designed to interface with a particular type of node equipment. For example, element servers 160–162 for an asynchronous transfer mode (ATM) switch such as a Concorde type or a Vector-type switch, or a Passport-type switch manufactured by Northern Telecom Limited, as illustrated in FIGS. 4, 6 and 16.

Figure 16:
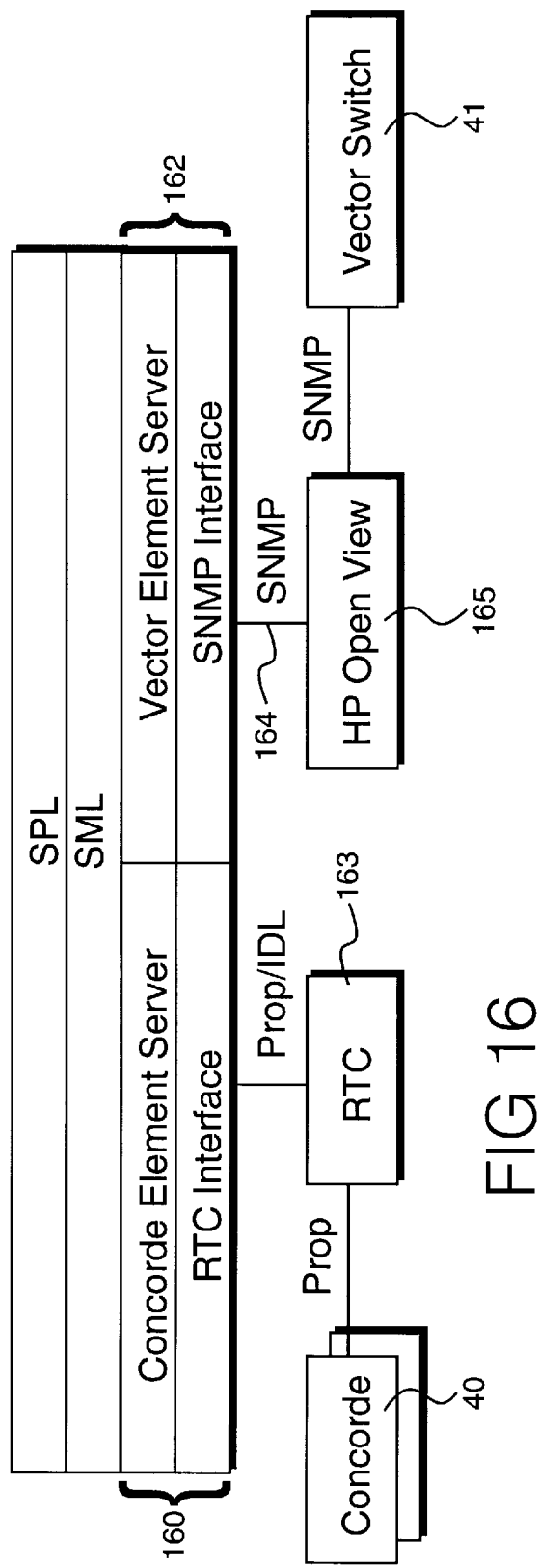
FIG. 16 illustrates a layout of part of an operating layer of the monitoring apparatus for collecting data signals from a plurality of network elements.
Figure 17:
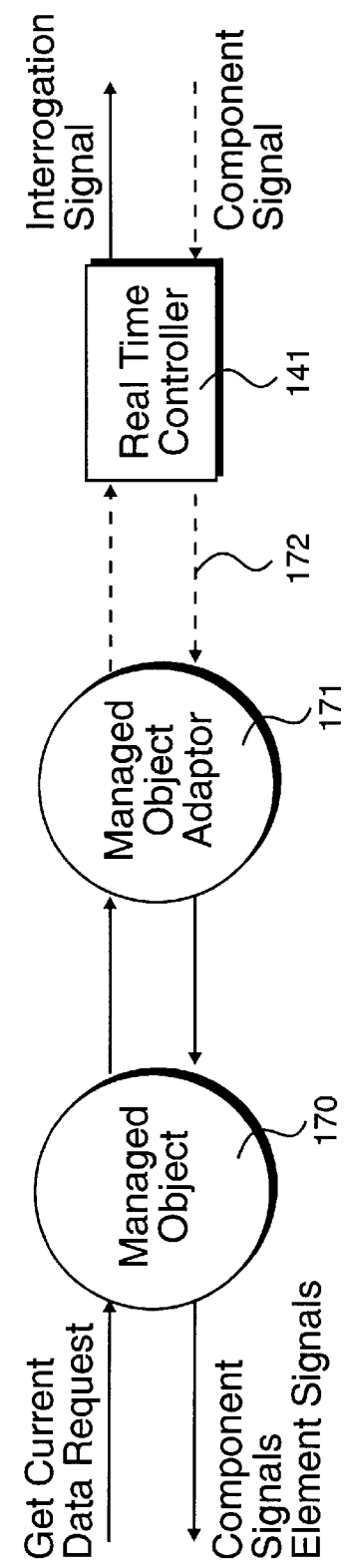
FIG. 17 illustrates an operation of an element server for interrogating an individual network element equipment, and for receiving data signals from the network element equipment.

Referring to FIGS. 16 and 17, in the case of a network element server 140 for interrogating the Concorde type ATM switch, retrieval of component signals is made by inspection of the historical database comprising part of the Concorde ATM switch. The Concorde switch continuously generates and stores component signals describing performance parameters of each of the components within the switch in the form of managed objects 170. The component signals stored in the Concorde switch are accessible through a system of control signals in the form of managed objects, which allow access to the component level signals through a SmallTalk language message (GetCurrentData). The SmallTalk managed object message 170 is passed to a Real Time Controller 163 through a managed object adaptor 171 over a known interface 172, for example a Corba IDL interface. The managed object adaptor 171 converts the component signal received from the Concorde switch to the form of a SmallTalk object 170, which is directly readable by the signal management layer, or which can be compiled along with other objects relating to component signals of other components into a network level element signal by the signal access layer.

The Concorde ATM switch is a relatively advanced switch type. The Vector type switch requires a network element server 162 configured specifically to be compatible with the Vector switch. The Vector network element server 162 comprises a Hewlett Packard Open View application, which sends signals to and receives signals from the Vector switch using the SNMP protocol. Alternatively, the component signals are compiled into a network level element signal by the signal access layer 43 prior to sending to the signal management layer.

Figure 18:
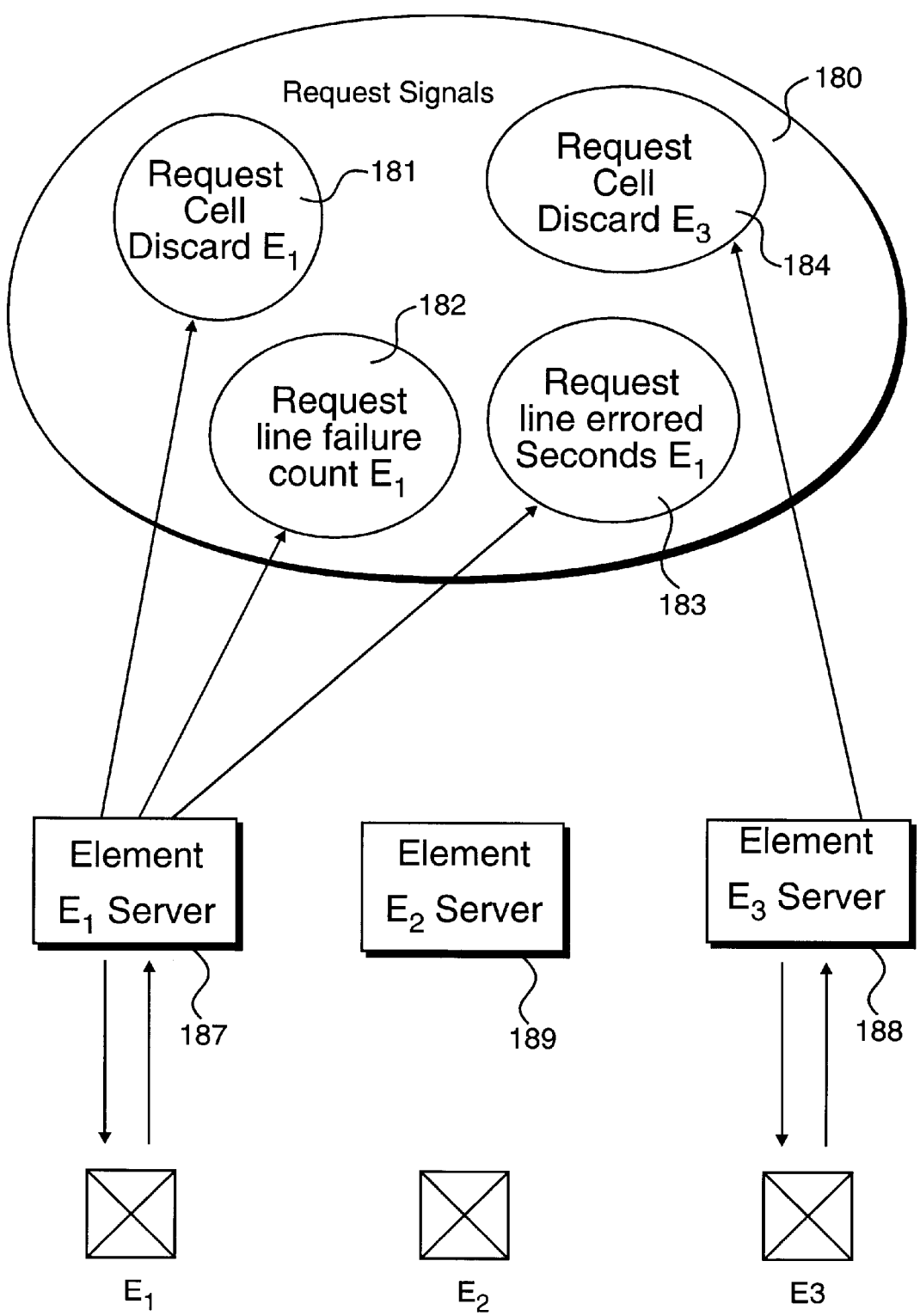
FIG. 18 illustrates a process for implementing collection of a plurality of data signals from a plurality of element servers.

Referring to FIG. 18, there is shown an example of operation of a set of node element servers 187–189. Each node element server collects component level signals from the corresponding node elements which it supports in response to a network level request signal 180 received from the signal management layer 44 requesting element or component signals from a plurality of elements. The request signal may comprise a plurality of subsidiary signal, portions 181 to 184. For example a request signal received by the signal access layer 43 may comprise a signal portion 181 requesting the cell discard for all components having cell pools in a switch element E1, a signal portion 182 requesting a line failure count for all appropriate components in the switch element E1, a signal portion 183 requesting the line errored seconds count for all appropriate components in the switch E1, and a signal portion 184 comprising a request for cell discard for all components having cell pools in a switch element E3.

The respective network element servers 187, 188, 189 for serving the corresponding network elements E1, E2, E3, each examine each request signal, and select the portion of the request signal which relates to the signal element which the signal element server supports. For example, in FIG. 18, element server 177 supporting node element switch E1, identifies signal portion 181 requesting cell discard on switch E1, signal portion 182 requesting line failure count on switch E1, and signal portion 183 requesting line errored seconds on switch E1. The element server 189 supporting switch E2 examines the request signal and finds no relevant portions relating to the supported switch E2. The network element server 188 supporting switch E3 examines the request signal and finds the portion 184 of the request signal which requests cell discard on switch E3.

Each network element server acts in accordance with the portion of the request signal which is appropriate to the corresponding network element which the network element server supports, and generates interrogation signals interrogating the individual components of the respective network elements supported. The corresponding network element returns corresponding component signals to the network element server. The network element servers convert the component level signals into a uniform protocol format, for example into objects in the language SmallTalk, or C++, which become available for use by the signal management layer, or for compilation into element signals.

If a network element server is unable to support a request specified in the request signal, for example if a request signal requests a line failure count on a switch, and the switch is not capable of providing a line failure count component signal, the element server will supply a null signal to the signal management layer indicating that this facility is unavailable for the requested switch.

Component signals generated by the signal access layer 43 are stored in the performance files 812, 813. A request signal may specify that component signals are collected in real time, in which case the component level signals will be stored in the performance file. Where a request signal specifies collection of component level signals over a predetermined period, predetermined by a user of the user interface 9, the resultant component level signals may be stored in the performance file. The performance files may be segregated into areas for storage of component signals corresponding to each supported element equipment type.

Collection of current data and historical data are managed by separate control applications within the network element servers. For example, collection of current component signals from a Concorde type switch may be managed by a Concorde current data management application 808, and collection of historical data may be collected by a historical data management application 809.

Representing Link Elements

Link elements such as fibre optic cables do not automatically generate component signals describing their operation. However, operational parameters of a link element can be determined by inspection of component signals supplied by node elements. For example in the case of bandwidth of a virtual channel component in a fibre optic cable, at either end of the fibre optic cable is a physical switch, which generates component signals relating to the volume of traffic received over a particular channel in the fibre optic cable. In the case of the Concorde switch, since each virtual channel component ends at an Ax card, by receiving component signals relating to the volume of cells transmitted and received through the Ax cards, there can be determined a volume of traffic over a particular virtual channel within the fibre optic cable, and hence the bandwidth supported by that channel. By processing component signals relating to each virtual channel within the fibre optic cable, a signal representing a figure for utilised bandwidth in the fibre optic cable can be determined at the network level.

Network Level Functions

Examples of network level functions, which are generic as between different switch types, and their origins in component signals on individual switch types, in this case Concorde and Vector switches, are as follows:

Monitor bandwidth utilisation per direction for a link;

To monitor the traffic usage of a link, an aggregate of all the virtual circuits and virtual paths running across a link is taken. The aggregate is taken as the number of cells transmitted on the path, averaged over a time interval, from which a bandwidth utilisation of the link is calculated. Data concerning the number of cells per path is available as component signals.

On the Concorde switch each link is composed of two uni-directional paths, and number of cells transmitted are measured on each other's paths to determine the bandwidth utilisation per direction. On the Concorde switch, component signals related to the number of transmitted cells and the total capacity are available, and the bandwidth utilisation is determined from these component signals.

On the Vector switch, cells must be measured on the associated ports at the end of each link. Component signals are described in the number of cells transmitted through a port, and component signals relating to an allocated bandwidth for a port are available. Generic network level signals (element signals) are calculated from the component signals.

This is one example of a generic network level operational parameter. Other generic parameters described by element signals comprise monitoring the VPI/VCI space utilisation for link monitoring the VPI/VCI percentage space utilisation for a link monitoring the bandwidth utilisation per quality of service per direction for a link monitoring the percentage bandwidth utilisation for quality of service per direction for a link monitoring the cell discard due to congestion per quality of service monitoring the percentage cell discard due to congestion per quality of service monitoring the queue fill per priority monitoring the percentage queue fill per priority.

Example of Network Level Monitoring

Figure 19:
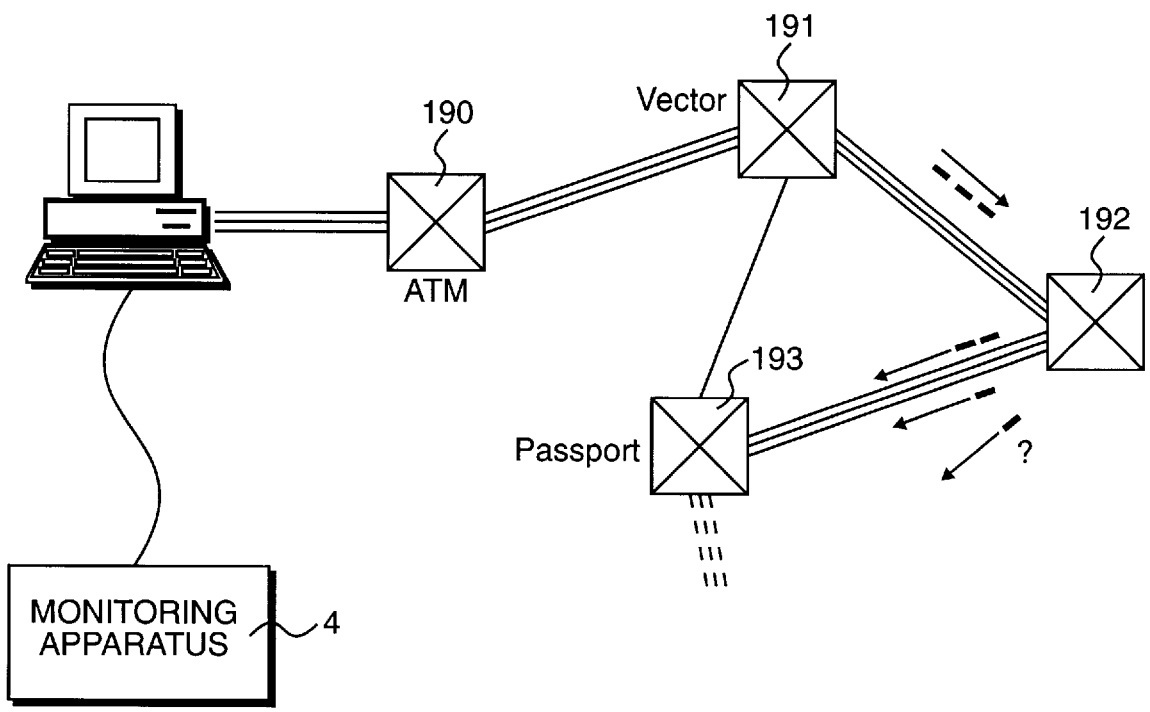
FIG. 19 illustrates an example of a network level monitoring process for determining a cell discard of a network element.
Figure 20:
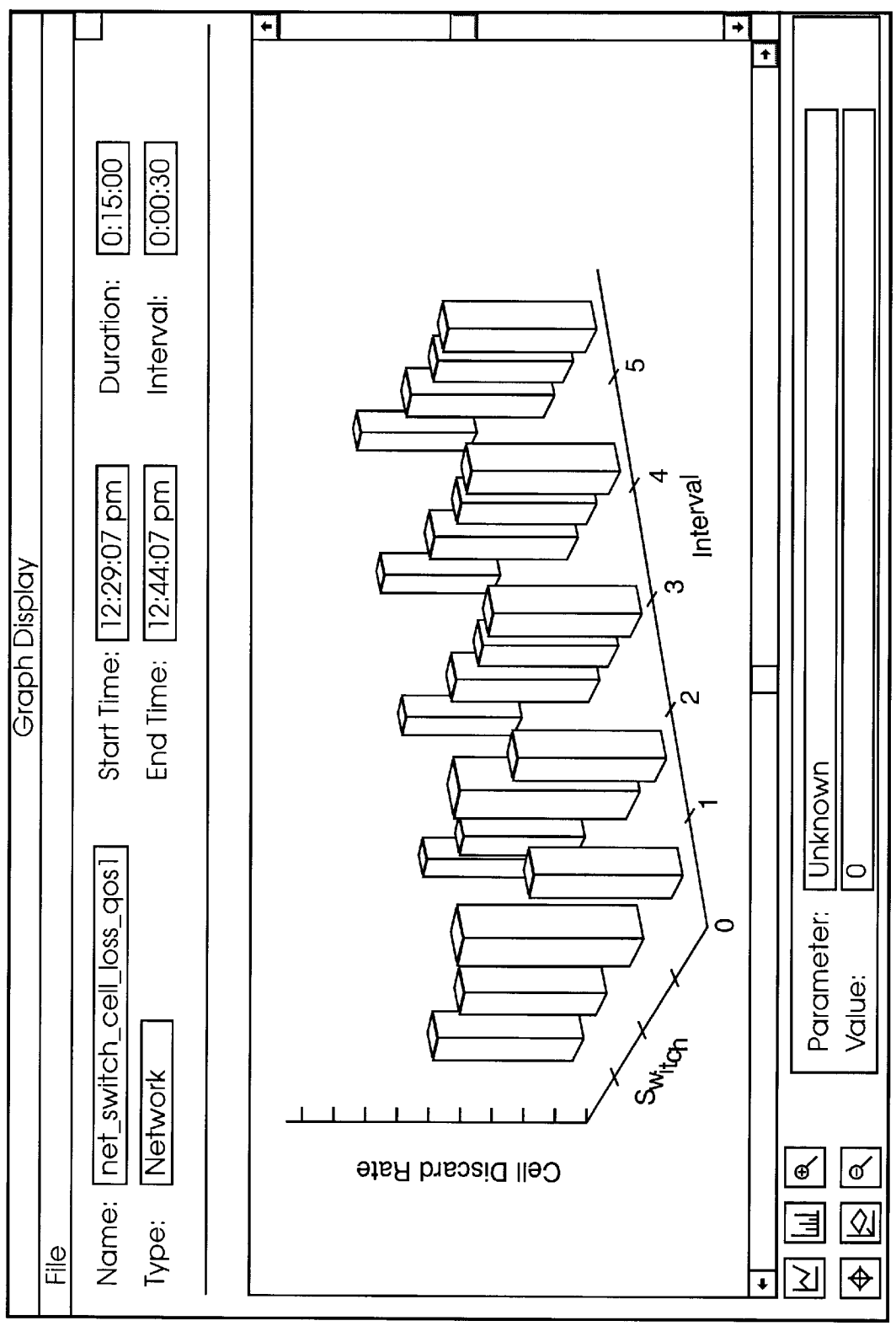
FIG. 20 illustrates a display in 3- dimensional graphical format of a set of operation parameters of a set of network elements.

Referring to FIG. 19 herein, a plurality of node equipment 190, 191, 192, 193 can each be monitored at the network level by making a network level query using the Session Manager display 110 and specifying the network level in the level display 114. The performance parameter to be monitored is selected in the Template Manager display 120. In an example of monitoring cell discard, each switch 190, 191, 192, 193 is interrogated over the network itself, to provide for each switch, a numerical figure representing the cell discard rate of the whole switch. A data output of the monitoring apparatus comprising a plot of cell discard rate with time for each switch can be plotted as a 3D visual display, as shown in FIG. 20, so that the overall cell discard on each node element can be compared to each other, even though the individual switches comprising the node elements are of different types. In FIG. 20, the cell discard is plotted on the vertical axis, for each of four different switch types plotted on the Y horizontal axis, over time intervals plotted on the X horizontal axis.

Figure 21:
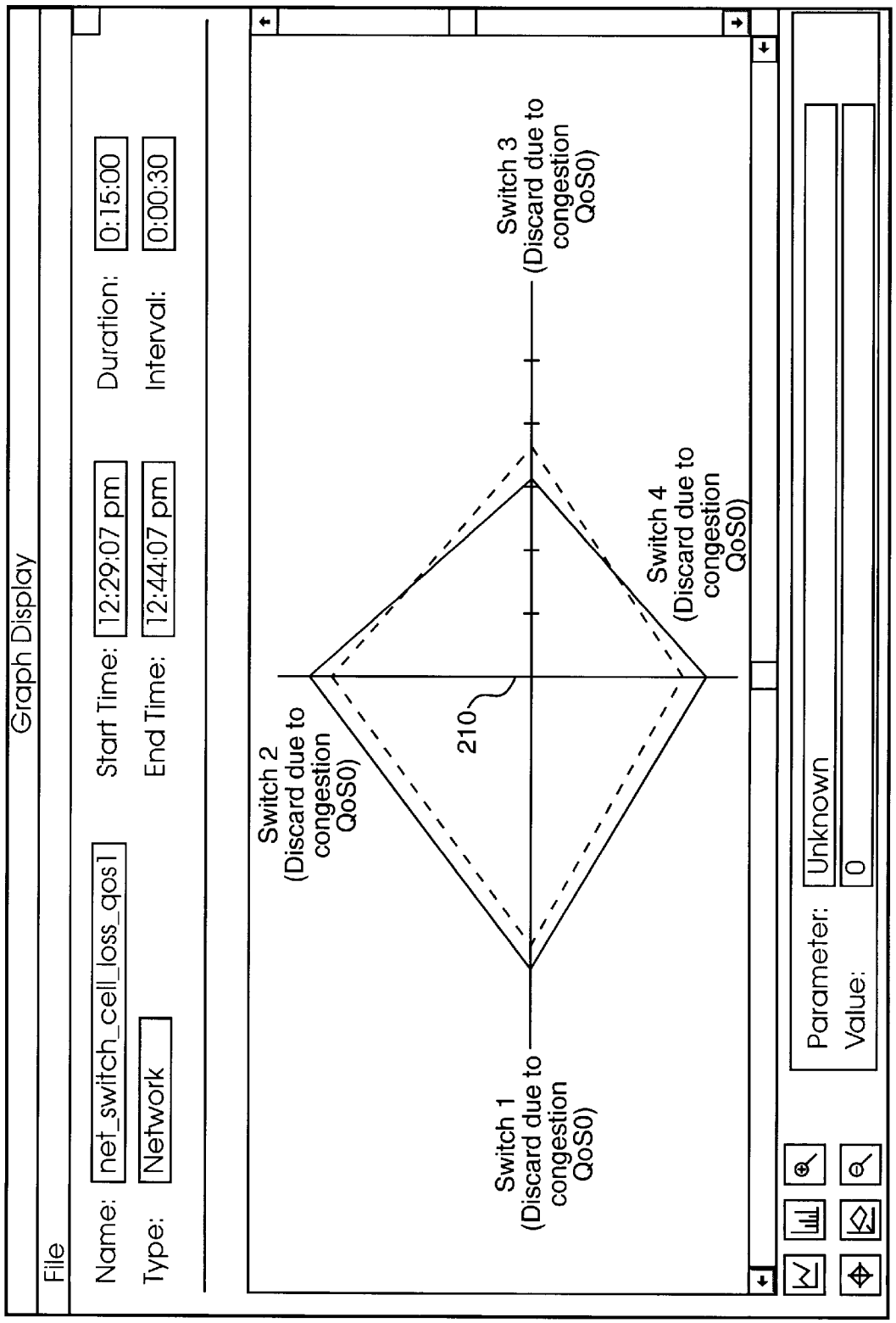
FIG. 21 illustrates a 2- dimensional display of a set of operation parameters of a set of network elements.

Referring to FIG. 21 herein, there is shown another data output of the monitoring apparatus comprising a two-dimensional visual display of cell discard at the network level for the switches comprising the node elements 190, 191, 192, 193 respectively of FIG. 19. The cell discard due to congestion is plotted radially outwards from origin 210 of the display. Using such a display, a large number of switches can be accommodated. Where the cell discard on each switch is roughly comparable, the display adopts a symmetrical shape. Any asymmetries in the display alert the user to a high cell discard rate on a particular switch. For example in FIG. 21 switch 1 shows a relatively high cell discard compared to switches 2, 3 and 4 and switch 3 shows a relatively low cell discard compared to switches 1, 2 and 4. By visual inspection of the display, this information is available to the user easily and in a readably understandable form.

Figure 22:
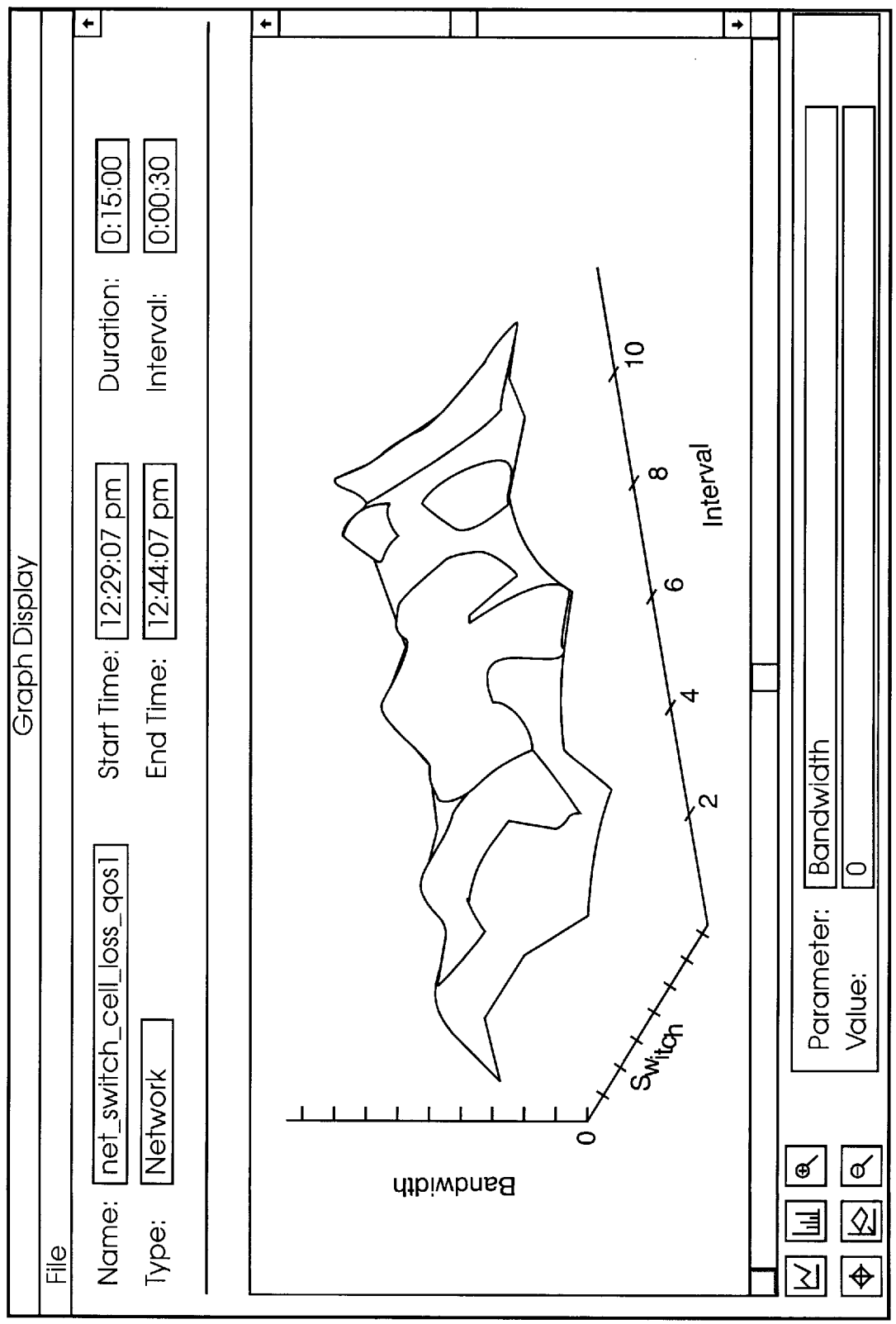
FIG. 22 illustrates a 3- dimensional surface display of a set of operational parameters of a plurality of network elements.

Referring to FIG. 22 herein, there is shown a 3-dimensional surface plot of net switch cell discard for a plurality of switches at the network level. Peaks in the 3-D surface indicate high cell loss for a switch. Using such a plot, a user can gain an overall view of the health of the network with respect to the cell discard parameter.

Service Level Functions

At the service level a user can inspect individual connections, treating the switch as a network level element, which is not sub-divided into constituent components, or as a component level item in which individual components can be inspected. Generic operation parameter functions, contained as data in element signals are determined at the service level from a plurality of component signals.

An example of a service level operation parameter for inspecting traffic over individual channel components of a link is the monitoring of usage data per connection per direction.

Cells transmitted from both end points of a connection over a link are monitored. The measure of cells transmitted from each end point of the connection effectively gives a measure of usage data per direction of the connection. A numerical value recorded could be either a count of cells transmitted, or an average cell count over a period time. Data concerning cells transmitted is available as component signals, which are counted to produce an element signal describing operation of the whole switch.

Other examples of operation parameters which can be monitored at the service level include;

monitor the bandwidth utilisation for a connection per direction monitor cell discard due to policing or a connection per direction.

Associated Service Level Functions

At an associated service level, which is a sub-set of the service level, the performance of individual components supporting a connection can be inspected. At the associated service level, individual connections can be traced through the network. A user can monitor the performance of a switch with respect to a particular connection, without having to understand the internal architecture of the switch equipment.

For example on a Concorde switch, a single connection will not pass through all the Ax cards physically stored in the switch. If a user wishes to monitor the cell discard of the switch with respect to an actual connection, then it is not necessary to sum the cell discard from all Ax cards on the switch, only from the Ax cards which the connection traverses. In the associated service level, a user can investigate a specific connection and see the status of particular network components supporting that connection. For example, a switch has a plurality of Ax cards, some of which may be overloaded. Using the tracing facility an Ax card supporting the connection may be found, and it may be that this particular Ax card of the switch is not overloaded. Thus, it can be diagnosed that although the switch has some overload Ax cards, by monitoring the connection of the associated service level, it is found that the Ax card of the switch supporting the connection is not overloaded. Only those parts of the switch supporting the connection of interest are investigated in a service level monitoring operation.

The user is presented with a single generic value for the operational parameter measures on the channel, so that the parameter on different channels, or different switch types can be directly compared, without the user needing to understand the complexities of the hardware supporting the channel.

In some switch types, channel tracing through individual components is unavailable. Under these circumstances, a switch from which the appropriate component signals are unavailable relating to individually traced channels is represented by an element signal, showing a performance of the switch as a whole. Thus, a user may be able to trace a channel though individual components on first and second switches, but unable to look at a third switch traversed by a channel at the same level of detail, as the other two switches. The third switch is treated as a discrete unit.

Figure 23:
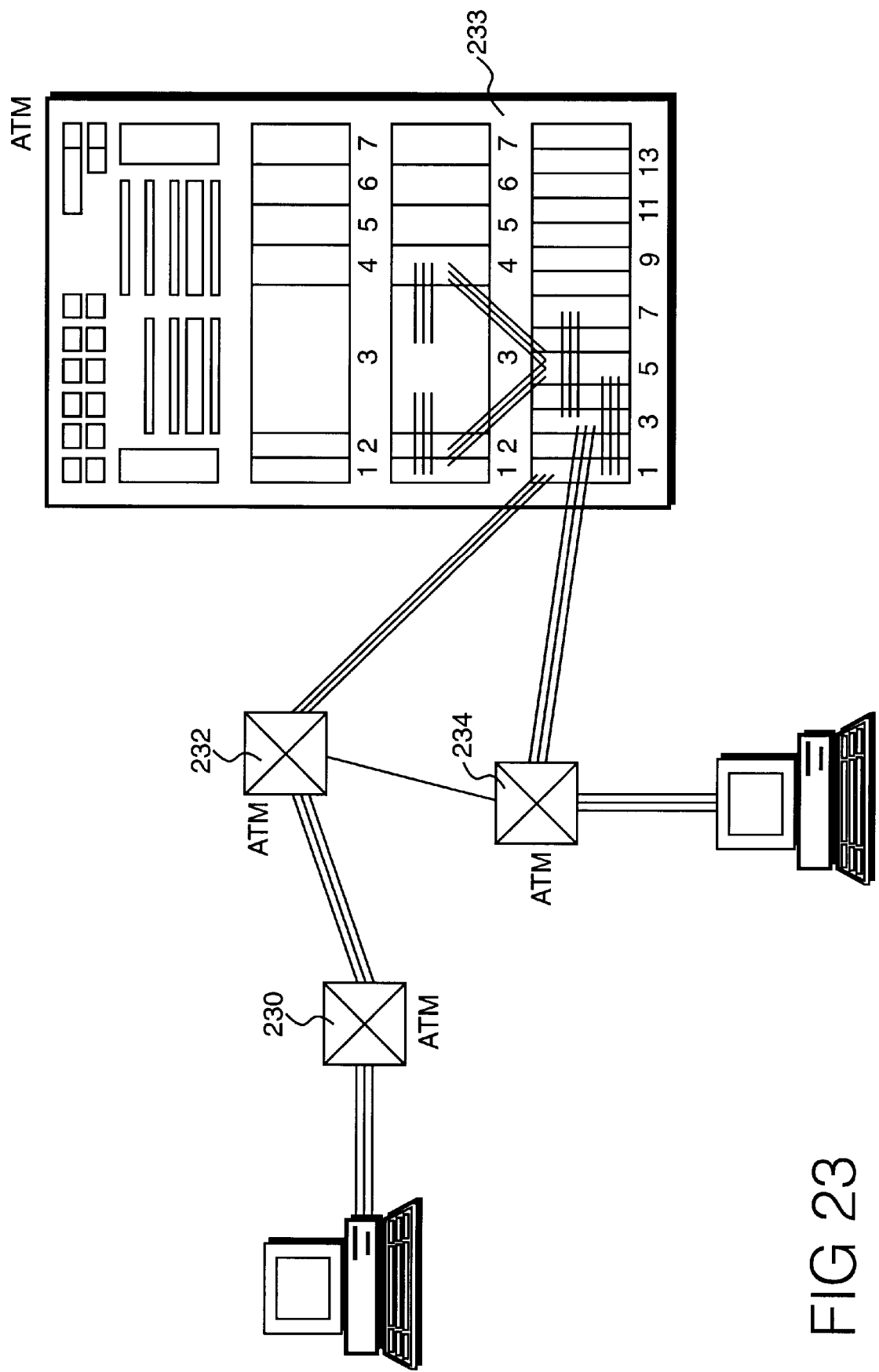
FIG. 23 illustrates an example of a service level monitoring of a network element in accordance with a specific process of the present invention.

Examples of operational parameters at the associated service level comprise;

monitor bandwidth utilisation per direction for the links that the connection traverses monitor bandwidth utilisation per direction per quality of service for the links that the connection traverses monitor VCI/VPI space utilisation for the links that the connection traverses monitor cell discard per quality of service due to congestion monitor queue fill per priority for each switch component that the connection traverses Example of Associated Service Level Monitoring Referring to the Session Manager display of FIG. 11, and the network portion of FIG. 23, an example of call tracing at the service level will now be described. A user wishing to trace a service connection between customers specifies the connection using the Session Manager display. The session Manager display displays a first switch and a second switch supporting the connection on the same display of the Session Manager. The request is encapsulated as an object, for example a Service Spec Element object. Individual node elements and components supporting the communications channel are read from the management information base 21 and are displayed in the component display 112 of the Session Manager display. Where for example, the parameter cell discard is selected using the Template Manager display 120, monitoring of the network components relating to the particular communications connection begins, under control of the signal management layer. Cell discard for each individual component identified as supporting the service is monitored over a user determined period. For example in the switch 233, only the individual line cards which support the actual channels carrying the service are monitored. Other line cards in the switch 233 carrying other services for other customers are not monitored, since the connection does not traverse those other components.

Using this approach, a user may identify any anomalous behaviour in the components supporting a service, without requiring a detailed hardware knowledge of the network equipment.

In some instances, where a particular type of node equipment, e.g. a switch does not support information concerning the parameter in relation to individual components, the user is provided with the best performance data available, for example the performance of the entire switch in relation to the specified parameter. For example, the user investigating a channel through the first to fourth switches may reveal an unusually high cell discard at a particular switch 233, leading to degradation of the overall channel performance.

We claim:

1. A method of monitoring operational parameters of a communications network comprising a plurality of interconnected node elements by contemporaneously performing a plurality of monitoring sessions, said method comprising the steps of:

for each monitoring session:

selecting a level of operational parameters to monitor;

creating a list of operational parameters supported by said selected level of operational parameters;

selecting at least one of said supported operational parameters from said list;

collecting data signals relating to said selected operational parameters; and creating a respective display of said data signals relating to said selected operational parameters, wherein said level of operational parameters to monitor are selected from the set:

network level monitoring for monitoring at least one individual node and/or link element of said communications network;

service level monitoring for monitoring a service through individual node elements of said communications network.

2. The method as claimed in claim 1, wherein said set further comprises: component level monitoring for monitoring individual components of said node elements of said communications network.

3. The method as claimed in claim 1, wherein said set further comprises: associated service level monitoring for monitoring a service through individual components of said node elements of said communications network.

4. The method as claimed in claim 1, wherein said step of creating a display includes arranging said data signals into a form suitable for presentation in graphical form.

5. The method as claimed in claim 1, further comprising the step of:

specifying a period of time over which said selected operational parameters are to be monitored.

6. The method as claimed in claim 1, wherein said supported operational parameters include data available from a historical data base and data which can be interrogated in real time.

7. The method as claimed in claim 1, wherein said step of selecting from said list comprises constructing and storing a template for monitoring operations.

8. The method as claimed in claim 1, wherein said data signals collected by a said monitoring session are not available to monitoring sessions of other users.

9. The method as claimed in claim 2, wherein said step of collecting data signals comprises:

checking if said data signals to be collected are available for said individual components of said network element; and if said data signals to be collected are unavailable for said individual component, collecting data signals relating to said operational parameters from said network element.

10. A data monitoring apparatus for monitoring operational parameters of a communications network comprising a plurality of interconnected network elements, in which a plurality of users can each contemporaneously perform at least one monitoring session, said apparatus comprising:

means for selecting a level of operational parameters to monitor;

means for creating a list of operational parameters supported by said selected level of operational parameters;

means for selecting at least one of said supported operational parameters from said list;

means for collecting data signals relating to said selected operational parameters; and means for creating a display of said data relating to said operational parameters, wherein said level of operational parameters to monitor is selected from the set:

network level monitoring for monitoring at least one individual node and/or link element of said communications network;

service level monitoring for monitoring a service through individual node elements of said communications network.

11. The data monitoring apparatus as claimed in claim 10, wherein said set further comprises:

component level monitoring for monitoring individual components of said network elements of said communications network.

12. The data monitoring apparatus as claimed in claim 10, wherein said set further comprises:

associated service level monitoring for monitoring a service through individual components of said node elements of said communications network.

13. The data monitoring apparatus as claimed in claim 10, wherein said means for creating a display includes means for arranging data signals into a form suitable for presentation in graphical form.

14. The data monitoring apparatus as claimed in claim 10, further comprising:

means for specifying period of time over which said operational parameters are to be monitored.

15. The data monitoring apparatus as claimed in claim 10, wherein said supported operational parameters include data available from historical data base and data which can be interrogated in real time.

16. The data monitoring apparatus as claimed in claim 10, wherein said means for selecting from said list constructs and stores a template for monitoring operations.

17. The data monitoring apparatus as claimed in claim 10, wherein said collected data signals collected by a said monitoring session are not accessible to monitoring sessions of another user.

18. The data monitoring apparatus as claimed in claims 11, wherein said means for collecting data signals comprises:

means for checking if said data signals to be collected are available for said individual components of said network element, wherein said means for checking is configured to collect data signals relating to said operational parameters from said network element if said data signals to be collected are unavailable for said individual components.

\* \* \* \* \*